United States Patent
Workman et al.

(10) Patent No.: US 9,923,393 B2
(45) Date of Patent: Mar. 20, 2018

(54) ENERGY STORAGE AND POWER SUPPLY SYSTEM

(71) Applicant: Goal Zero LLC, Bluffdale, UT (US)

(72) Inventors: Robert E. Workman, Morgan, UT (US); Norman Krantz, Draper, UT (US); Henry J. Howell, Herriman, UT (US); Fred Lillywhite, Cottonwood Heights, UT (US); Jaremy Butler, Herriman, UT (US); Walker Ford, Holladay, UT (US); Keyvan Vasefi, Payson, UT (US); Sterling Robison, Bluffdale, UT (US); Michael Roner, Sandy, UT (US)

(73) Assignee: Goal Zero LLC, Bluffdale, UT (US)

( * ) Notice: Subject to any disclaimer, the term of this patent is extended or adjusted under 35 U.S.C. 154(b) by 308 days.

(21) Appl. No.: 14/794,636

(22) Filed: Jul. 8, 2015

(65) Prior Publication Data

US 2016/0013675 A1    Jan. 14, 2016

Related U.S. Application Data

(60) Provisional application No. 62/022,631, filed on Jul. 9, 2014.

(51) Int. Cl.
*H02J 7/00* (2006.01)
*H02J 7/14* (2006.01)
*H02J 7/35* (2006.01)

(52) U.S. Cl.
CPC .......... *H02J 7/0045* (2013.01); *H02J 7/0052* (2013.01); *H02J 7/355* (2013.01); *H02J 7/0054* (2013.01);

(Continued)

(58) Field of Classification Search
USPC ........ 320/101, 107, 111, 103, 113, 114, 115, 320/108, 118, 121, 138, 112, 134;
(Continued)

(56) References Cited

U.S. PATENT DOCUMENTS

| D45,257 S | 2/1914 | Hasburg |
| D60,285 S | 1/1922 | Appleton |

(Continued)

FOREIGN PATENT DOCUMENTS

WO   WO-2011/106431 A2   9/2011

OTHER PUBLICATIONS

U.S. Appl. No. 12/945,583, filed Nov. 12, 2010, Workman et al.
(Continued)

*Primary Examiner* — Alexis Pacheco
(74) *Attorney, Agent, or Firm* — Foley & Lardner LLP

(57) ABSTRACT

An energy storage and power supply system includes a body having a first end and an opposing second end, a battery pack disposed within the body, a first connector disposed at the first end of the body and electrically coupled to the battery pack, the first connector including a male connector configured to receive electrical power to charge the battery pack, a second connector disposed at the opposing second end of the body and electrically coupled to the battery pack, the second connector including a female connector configured to provide a power output from the battery pack, and a collar slidably coupled to the opposing second end of the body and movable between an extended position and a retracted position. The collar is configured to engage with and thereby retain an accessory when selectively reoriented into the extended position.

20 Claims, 21 Drawing Sheets

(52) U.S. Cl.
CPC ........... *H02J 7/0055* (2013.01); *H02J 7/0068* (2013.01); *H02J 2007/0062* (2013.01)

(58) Field of Classification Search
USPC .......................... 439/131, 628; 307/147, 150
See application file for complete search history.

(56) References Cited

U.S. PATENT DOCUMENTS

| | | | |
|---|---|---|---|
| 3,026,957 A | 3/1962 | Gladstone | |
| D192,757 S | 5/1962 | Foss | |
| D201,320 S | 6/1965 | Hirohama | |
| 3,438,529 A | 4/1969 | Lohrer | |
| D221,081 S | 7/1971 | Kahn | |
| 4,497,881 A | 2/1985 | Bertolino | |
| D364,375 S | 11/1995 | Sakashita et al. | |
| 6,479,963 B1* | 11/2002 | Manor | H01M 2/1022 320/110 |
| 6,501,197 B1 | 12/2002 | Cornog et al. | |
| 6,709,784 B2* | 3/2004 | Resch | H01M 6/5033 320/103 |
| D554,621 S | 11/2007 | Yao | |
| 7,291,041 B1* | 11/2007 | Yang | H02J 7/0042 320/107 |
| D572,586 S | 7/2008 | Medema | |
| D599,286 S | 9/2009 | Horito et al. | |
| D600,000 S | 9/2009 | Horito et al. | |
| 7,633,759 B2 | 12/2009 | Tracy et al. | |
| D625,251 S | 10/2010 | Workman et al. | |
| D629,746 S | 12/2010 | Workman et al. | |
| D642,057 S | 7/2011 | Reed et al. | |
| D650,771 S | 12/2011 | Chen | |
| 8,080,972 B2 | 12/2011 | Smith | |
| D651,564 S | 1/2012 | Workman et al. | |
| 8,089,244 B2 | 1/2012 | Zhang et al. | |
| 8,139,353 B2 | 3/2012 | Slaby et al. | |
| 8,182,274 B1 | 5/2012 | Cheng et al. | |
| D664,499 S | 7/2012 | Workman et al. | |
| D670,244 S | 11/2012 | Workman et al. | |
| D693,765 S | 11/2013 | Workman et al. | |
| D697,028 S | 1/2014 | Workman et al. | |
| 9,024,570 B2 | 5/2015 | Workman et al. | |
| 9,407,104 B2* | 8/2016 | Manor | H02J 7/0054 |
| 2002/0039016 A1* | 4/2002 | You, II | H01M 2/1055 320/115 |
| 2005/0017674 A1* | 1/2005 | Sato | H02J 7/0008 320/106 |
| 2005/0032403 A1 | 2/2005 | Ishihara | |
| 2005/0248312 A1* | 11/2005 | Cao | H02J 7/0031 320/114 |
| 2006/0097692 A1* | 5/2006 | Chen | H02J 7/0042 320/107 |
| 2009/0098750 A1 | 4/2009 | Randall | |
| 2009/0167239 A1 | 7/2009 | Yano et al. | |
| 2011/0116254 A1 | 5/2011 | Workman et al. | |
| 2011/0162690 A1 | 7/2011 | Workman et al. | |
| 2011/0190659 A1 | 8/2011 | Long et al. | |
| 2011/0290307 A1 | 12/2011 | Workman et al. | |
| 2012/0223673 A1 | 9/2012 | Chen et al. | |
| 2012/0281392 A1 | 11/2012 | Workman et al. | |
| 2013/0181661 A1 | 7/2013 | Workman et al. | |

OTHER PUBLICATIONS

U.S. Appl. No. 13/579,266, filed Aug. 15, 2012, Workman et al.
U.S. Appl. No. 14/326,258, filed Jul. 8, 2014, Goal Zero LLC.
U.S. Appl. No. 14/806,456, filed Jul. 22, 2015, Goal Zero LLC.
U.S. Appl. No. 29/387,865, filed Mar. 18, 2011, Workman et al.
U.S. Appl. No. 29/410,374, filed Jan. 6, 2012, Workman et al.
U.S. Appl. No. 29/410,376, filed Jan. 6, 2012, Workman et al.
U.S. Appl. No. 29/410,386, filed Jan. 6, 2012, Workman et al.
U.S. Appl. No. 29/496,019, filed Jul. 8, 2014, Goal Zero LLC.
U.S. Appl. No. 29/513,754, filed Jan. 5, 2015, Goal Zero LLC.
U.S. Appl. No. 61/261,656, filed Nov. 16, 2009, Workman, Robert E. et al.
U.S. Appl. No. 61/483,515, filed May 6, 2011, Workman, Robert E. et al.
U.S. Appl. No. 62/022,631, filed Jul. 9, 2014, Goal Zero LLC.

* cited by examiner

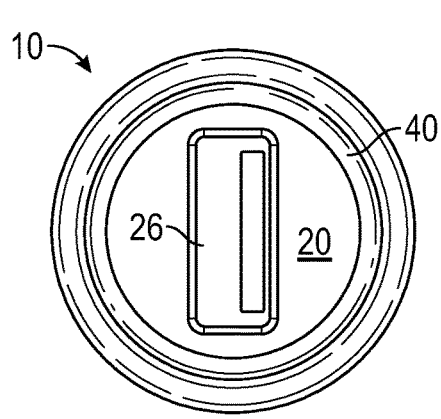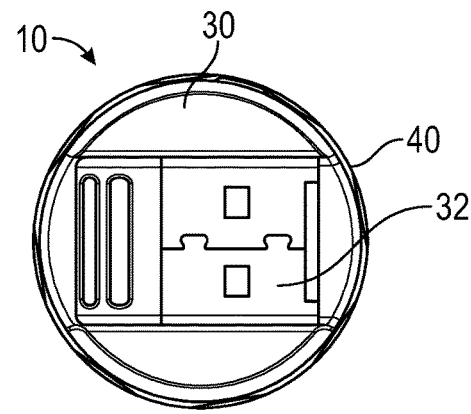
FIG. 7　　　　　FIG. 8A
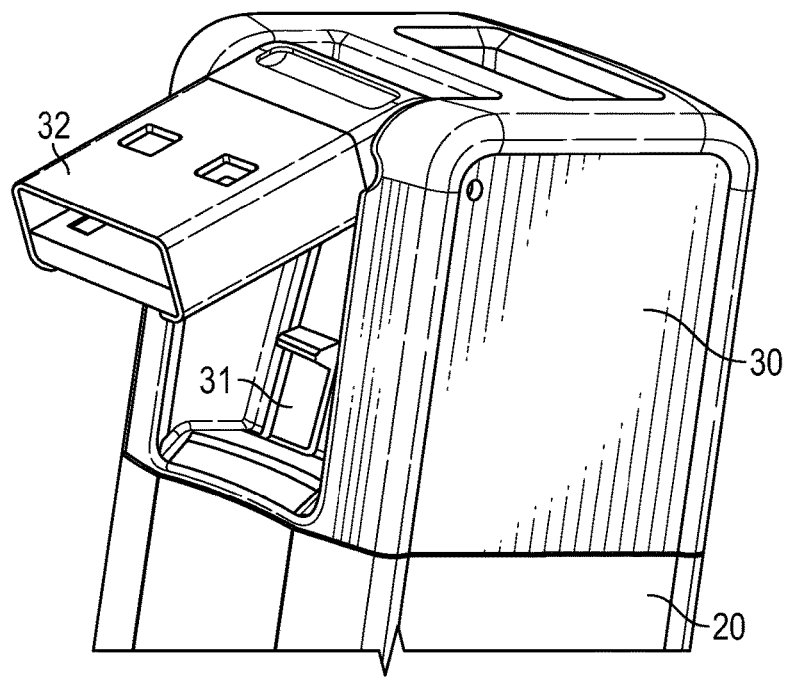
FIG. 8B

ENERGY STORAGE AND POWER SUPPLY SYSTEM

CROSS-REFERENCE TO RELATED APPLICATIONS

This Application claims the benefit of U.S. Provisional Patent Application No. 62/022,631, titled "Energy Storage and Power Supply System" and filed Jul. 9, 2014, which is incorporated herein by reference in its entirety.

BACKGROUND

The present disclosure relates to portable power supply systems. In particular, the present disclosure relates to portable power supply systems that may be charged to store electrical energy and discharged to power external electronic devices.

Energy storage devices often include one or more batteries that may be charged to store electrical energy. Such energy storage devices may be used to extend the battery life of various electronic components (e.g., a cellular telephone, a camera, etc.) when access to traditional power sources is limited. A connector may be used to couple the energy storage device with a source of electrical power (e.g., a wall outlet, etc.). A user may couple the energy storage device to an electronic device to either power the electronic device or charge a battery of the electronic device. Such connectors used to couple the energy storage device to the electronic device may disengage, thereby inadvertently terminating the power supply to the electronic device. Inadvertent termination may occur more frequently where the energy storage device is a portable unit.

SUMMARY

One exemplary embodiment of the present disclosure relates to an energy storage and power supply system that includes a body having a first end and an opposing second end, a battery pack disposed within the body, a first connector disposed at the first end of the body and electrically coupled to the battery pack, the first connector including a male connector configured to receive electrical power to charge the battery pack, a second connector disposed at the opposing second end of the body and electrically coupled to the battery pack, the second connector including a female connector configured to provide a power output from the battery pack, and a collar slidably coupled to the opposing second end of the body and movable between an extended position and a retracted position. The collar is configured to engage with and thereby retain an accessory when selectively reoriented into the extended position.

Another exemplary embodiment of the present disclosure relates to an energy storage and power supply system that includes a body, a battery pack disposed within the body and having a first end and an opposing second end, a first connector electrically coupled to the first end of the battery pack, the first connector including a male connector configured to receive electrical power to charge the battery pack, a second connector electrically coupled to the opposing second end of the battery pack, the second connector including a female connector configured to provide a power output to an accessory from the battery pack, and a collar configured to engage with and thereby selectively retain the accessory. The battery pack has both a positive pole and a negative pole at each of the first end and the opposing second end such that the battery pack operates as part of the energy storage and power supply system regardless of the orientation thereof.

Still another exemplary embodiment of the present disclosure relates to an energy storage and power supply system that includes a body and a battery pack disposed within the body and having a first set of positive and negative poles and a second set of positive and negative poles. The negative poles of the battery pack at least one of (a) surround the positive poles of the battery pack and (b) are surrounded by the positive poles of the battery pack. The energy storage and power supply system further includes a first connector electrically coupled to the first set of positive and negative poles with a first set of contacts, a second connector electrically coupled to the second set of positive and negative poles with a second set of contacts, and a collar configured to engage with and thereby selectively retain an accessory. The first set of positive and negative poles and the first set of contacts are at least one of shaped, configured, and positioned to maintain electrical continuity between the battery pack and the first connector regardless of the relative orientations thereof.

The invention is capable of other embodiments and of being carried out in various ways. Alternative exemplary embodiments relate to other features and combinations of features as may be generally recited in the claims.

BRIEF DESCRIPTION OF THE DRAWINGS

The disclosure will become more fully understood from the following detailed description taken in conjunction with the accompanying drawings wherein like reference numerals refer to like elements, in which:

FIG. 7 is a right side plan view of the energy storage and power supply system of FIGS. 1-2;

FIG. 8A is a left side plan view of the energy storage and power supply system of FIGS. 1-2;

FIGS. 8B-8C are perspective views an energy storage and power supply system having a connector that may be actuated to engage a switch, according to an alternative embodiment;

FIGS. 18-21A are perspective views of a battery pack, according to an exemplary embodiment;

DETAILED DESCRIPTION

Figure 1:
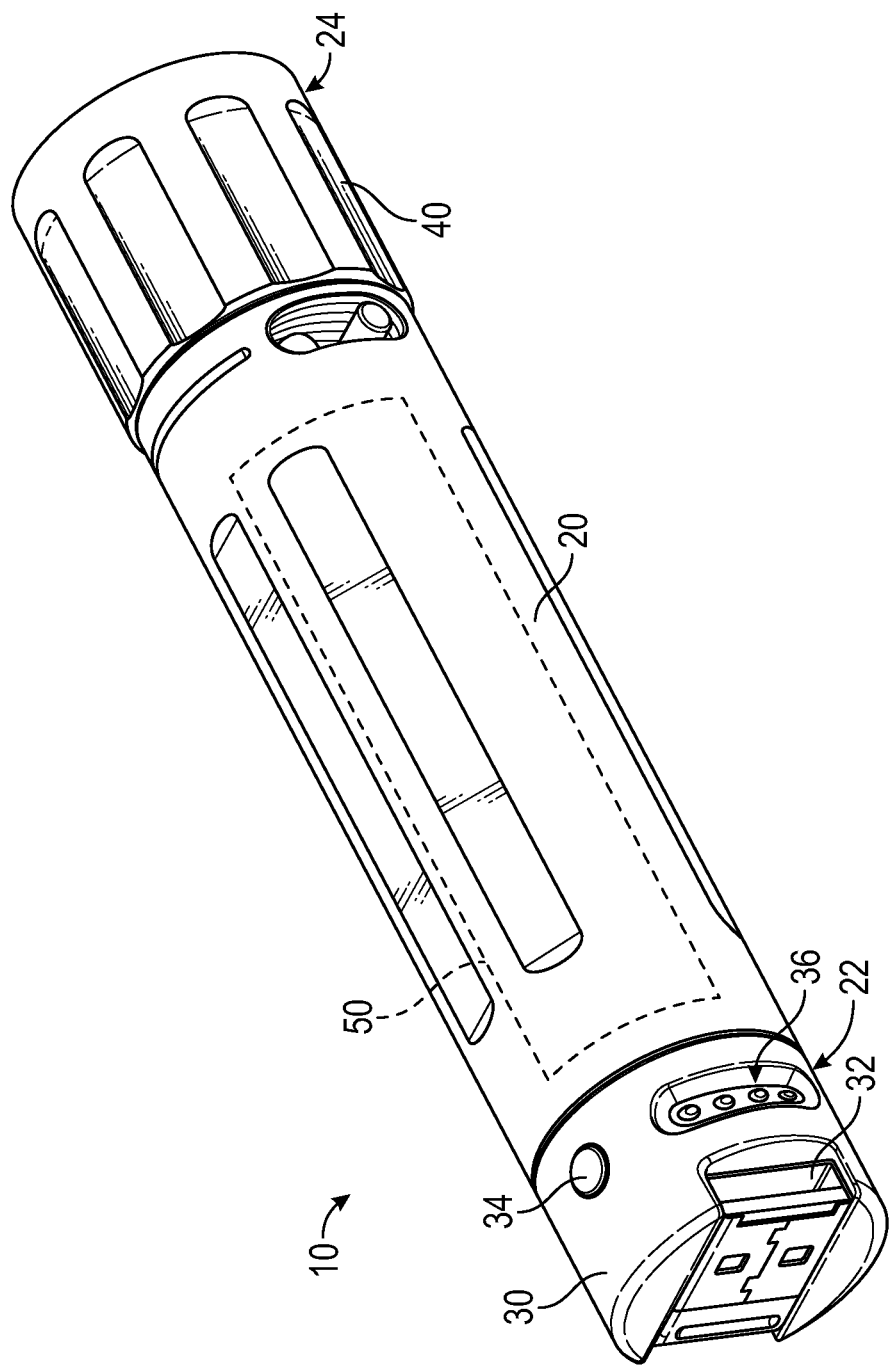
FIGS. 1-2 are front perspective views of an energy storage and power supply system, according to an exemplary embodiment.
Figure 2:
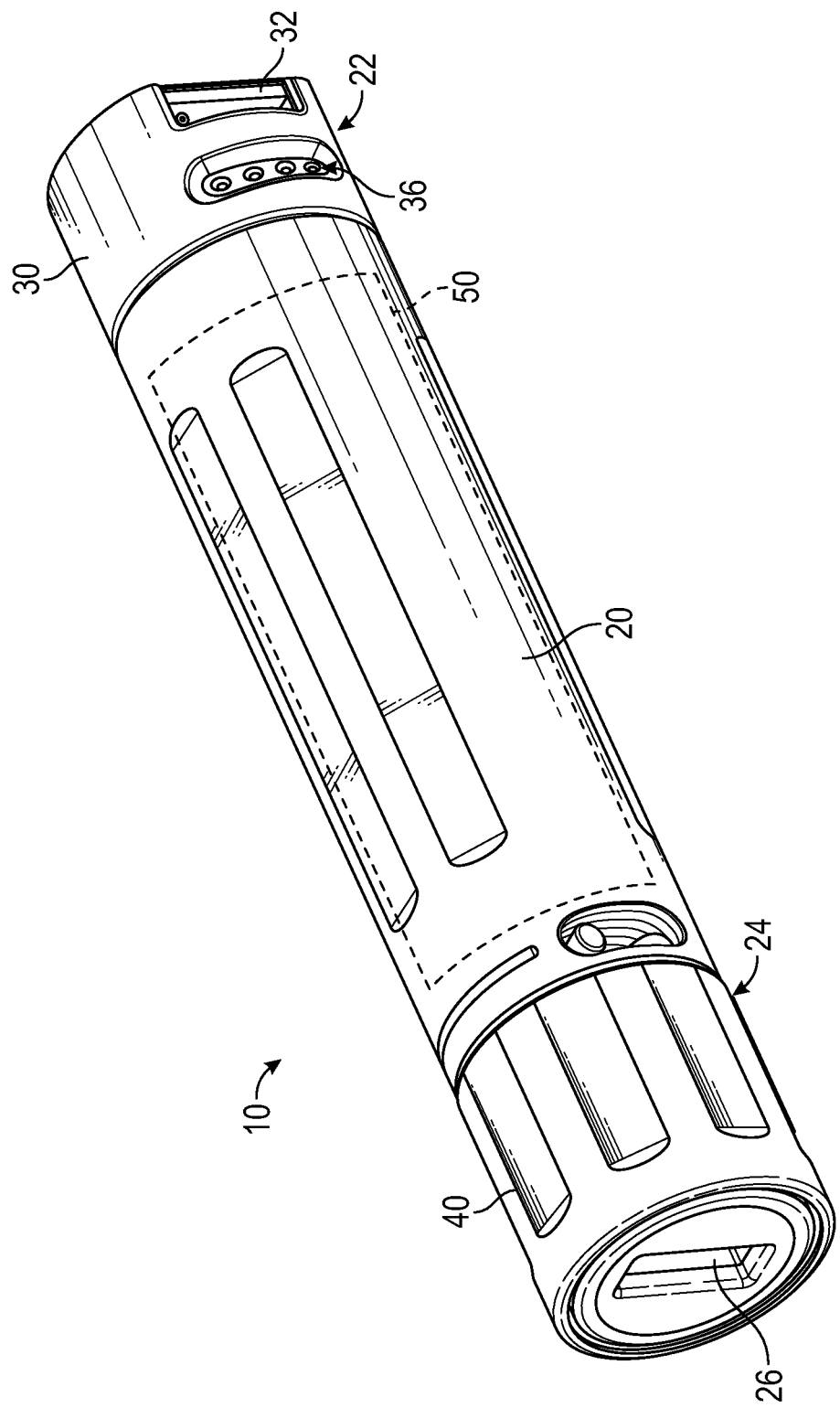
Figure 3:
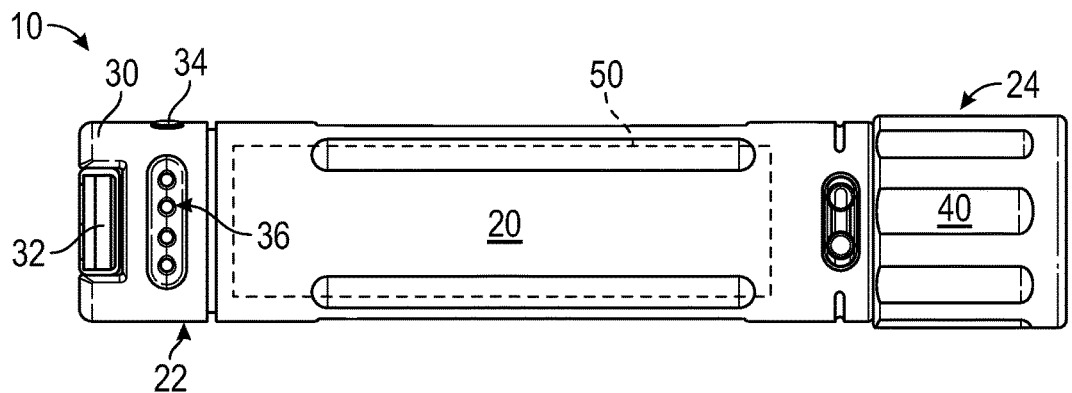
FIG. 3 is a front plan view of the energy storage and power supply system of FIGS. 1-2.
Figure 4:
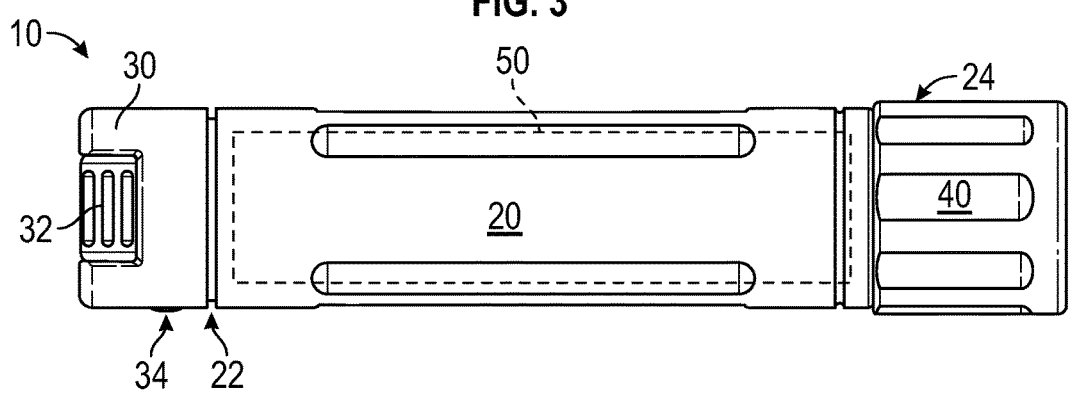
FIG. 4 is a rear plan view of the energy storage and power supply system of FIGS. 1-2.
Figure 5:
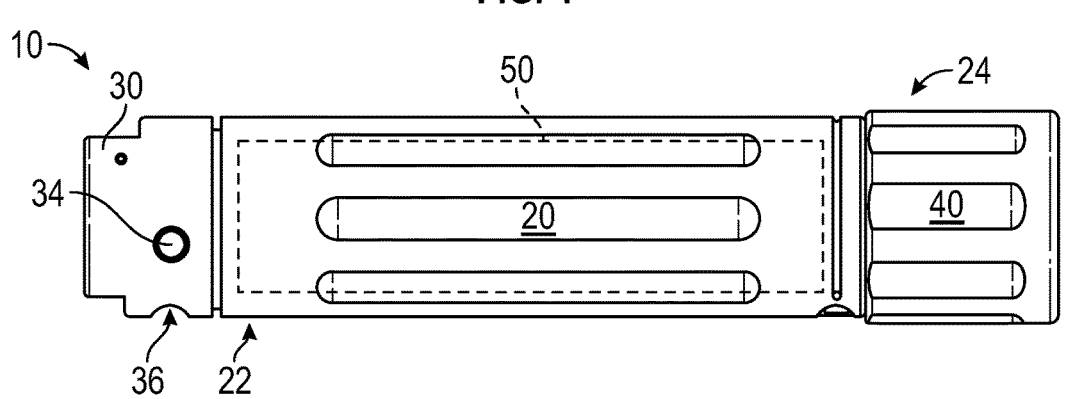
FIG. 5 is a top plan view of the energy storage and power supply system of FIGS. 1-2.
Figure 6:
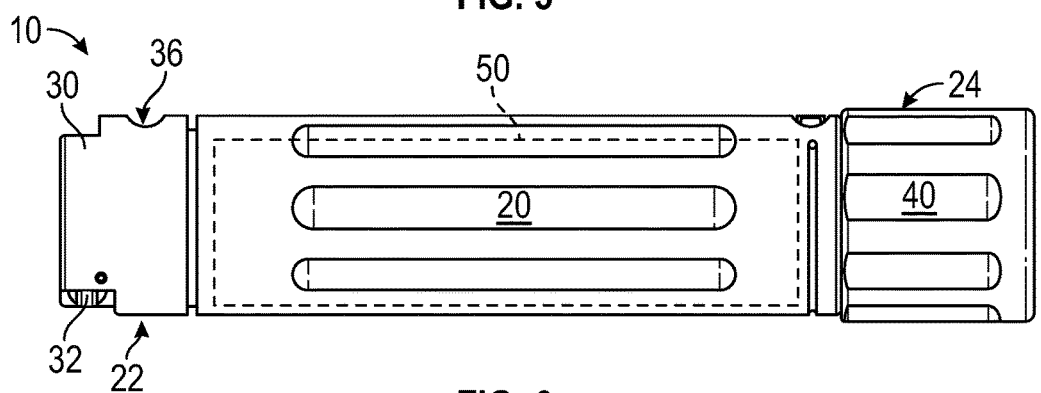
FIG. 6 is a bottom plan view of the energy storage and power supply system of FIGS. 1-2.

Before turning to the figures, which illustrate the exemplary embodiments in detail, it should be understood that the application may be not limited to the details or methodology set forth in the description or illustrated in the figures. It should also be understood that the terminology may be for the purpose of description only, and should not be regarded as limiting.

According to an exemplary embodiment, an energy storage and power supply system stores energy for later use. In one embodiment, the energy storage and power supply system stores electrical energy that is used to charge or otherwise power an electrical or electronic device (e.g., a mobile computing device, a cellular phone, a gaming device, a computer, etc.). The electrical energy may be stored and used in discrete, sequential steps, or the electrical energy may be stored and used simultaneously. The energy storage and power supply system incorporates various features that facilitate operation by a user, according to an exemplary embodiment. In one embodiment, the energy storage and power supply system includes a mechanical fastening system configured to reinforce an interface between a port (e.g., a port that provides a power output from the energy storage and power supply system, a port that provides power to charge the energy storage and power supply system, etc.) and an electrical connector (e.g., the electrical connector providing the output power from the energy storage and power supply system, the electrical connector used to charge the energy storage and power supply system, etc.). By way of example, the energy storage and power supply system may include a collar that may be twisted or otherwise actuated to lock onto a specialized accessory (e.g., tip, etc.) to increase the mechanical strength of the connection. The collar may be locked in a retracted position when another connector is used (e.g., a non-specialized tip, a standard USB connector, etc.). In one embodiment, the collar snaps over a silicone rubber o-ring and locks in a retracted (e.g., down, etc.) position. According to an exemplary embodiment, the energy storage and power supply system includes a battery pack having two ends, either of which may be inserted first into the energy storage and power supply system without impacting the operation thereof. By way of example, the battery pack may include a rechargeable 18650 cell and have dual rings on both ends such that the energy storage and power supply system will function normally regardless which end of the battery pack is inserted first. Multiple cells may be used in the system, and appropriate circuitry may be provided in series or in parallel. The battery pack may be installed without requiring user education or additional thought on the part of the user.

According to the exemplary embodiments shown in FIGS. 1-8A, an energy storage and power supply system, shown as energy storage and power supply system 10, includes a body 20 having a first end 22 and a second end 24. As shown in FIGS. 1-8A, energy storage and power supply system 10 includes a cap, shown as cap 30, disposed at first end 22 of body 20. According to an exemplary embodiment, cap 30 defines a charging cap that corresponds to a charging end of energy storage and power supply system 10. Cap 30 may include various connectors to facilitate operation of energy storage and power supply system 10. As shown in FIGS. 1-8A, a connector, shown as connector 32, is coupled to cap 30. Energy storage and power supply system 10 includes a coupler, shown as collar 40, disposed at second end 24 of body 20, according to the embodiment shown in FIGS. 1-8A. Collar 40 may define a discharge end of energy storage and power supply system 10. A battery pack 50 may be charged using the charging end, and power from the battery pack 50 may be utilized (e.g., to power remote devices, to charge battery packs of remote devices, etc.) via the discharge end of energy storage and power supply system 10, according to an exemplary embodiment. Energy storage and power supply system 10 thereby stores electrical energy for later use (e.g., energy storage and power supply system 10 may charge battery pack 50 and also have a power output, etc.). According to an exemplary embodiment, the charging end and the discharge end are electrically coupled to opposing ends of battery pack 50.

As shown in FIGS. 1-8A, body 20 is elongated and has a generally circular cross-sectional shape. In other embodiments, body 20 has another cross-sectional shape (e.g., rectangular, square, pentagonal, hexagonal, etc.). Body 20 is tubular, according to an exemplary embodiment, and defines an inner volume separated from an outer surface by a sidewall. Body 20 may contain one or more components within the inner volume that facilitate operation or use of energy storage and power supply system 10 by a user. By way of example, body 20 may contain one or more battery packs 50, power electronics associated with charging and discharging the one or more battery packs 50, still other electronic devices, or still other components. According to the exemplary embodiment shown in FIGS. 1-8A, the outer surface of body 20 defines a plurality of flutes. In other embodiments, the outer surface of body 20 is otherwise textured (e.g., uniformly textured, otherwise shaped, etc.).

In one embodiment, cap 30 is coupled to body 20. By way of example, cap 30 may be coupled to body 20 with a snap-fit connection, a press-fit connection, using one or more fasteners (e.g., snap rings, etc.), or with still another connection. According to an exemplary embodiment, cap 30 is coupled to body 20 with a threaded connection. In one embodiment, cap 30 includes a male threaded portion that is received by (e.g., threaded into, etc.) a female threaded portion of body 20. Cap 30 may have dimensions and a shape that are similar to those of body 20. In other embodiments, cap 30 is otherwise shaped.

According to the exemplary embodiment shown in FIGS. 1-8A, connector 32 includes a male USB connector. In other embodiments, connector 32 includes a female micro USB connector, wall socket prongs (e.g., AC prongs, etc.), a male 12V plug (e.g., an end commonly received into a cigarette lighter, etc.), or still other components. Connector 32 may be plugged into a portable computer device, another portable energy storage and power supply system, or engage one or more solar panels and receive electrical energy therefrom. The electrical energy may flow through connector 32 to at least one of charge the battery pack 50 and directly power another portable electronic device. According to an alternative embodiment, connector 32 includes a female port configured to receive a power supply system or an associated cable end having a male connector. According to still another alternative embodiment, a male connector and a female port are both coupled to cap 30 such that battery pack 50 may be charged using various types of power input connectors.

In one embodiment, connector 32 is pivotally mounted to cap 30. Pivotally mounting connector 32 to cap 30 may reduce the risk of damage to connector 32 when not in use (e.g., while transporting energy storage and power supply system 10, etc.). In other embodiments, the orientation of connector 32 is fixed relative to cap 30.

Cap 30 includes a user interface that has an operator input device, shown as button 34, and a display, shown as indicator lights 36, according to the exemplary embodiment shown in FIGS. 1-8A. In one embodiment, a user may engage (e.g., depress, etc.) button 34 to selectively display a charge level of the battery pack 50 via indicator lights 36. By way of example, one, two, three, and four of the indicator lights 36 may illuminate where the battery pack 50 has a charge level of less than or equal to 25%, 50%, 75%, and 100%, respectively. In other embodiments, the user interface includes more or fewer indicator lights 36 that illuminate to show a corresponding charge level of the battery pack 50. One or more of the indicator lights 36 may flash where the battery pack has a charge level below a threshold (e.g., below 5%, etc.).

As shown in FIGS. 1-8A, cap 30 includes both button 34 and indicator lights 36. In other embodiments, cap 30 includes only one of button 34 and indicator lights 36 or includes neither button 34 nor indicator lights 36. By way of example, at least one of button 34 and indicator lights 36 may be disposed on body 20, collar 40, or still another portion of energy storage and power supply system 10.

As shown in FIGS. 1-8A, the operator input device of the user interface includes button 34, which an operator may press to control at least a portion of energy storage and power supply system 10. In other embodiments, the user input device includes a switch, a touch screen, another type of touch interface (e.g., including a conductivity sensor, etc.), or still another device. The user input device may include a single input component or a plurality of input components, according to various embodiments.

Referring still to FIGS. 1-8A, the display of the user interface includes indicator lights 36, which illuminate (e.g., upon engagement of button 34, etc.) to provide information to a user. By way of example, indicator lights 36 may illuminate when the user presses button 34 to show a present charge state of battery pack 50. By way of another example, indicator lights 36 may flash, sequentially illuminate, or otherwise indicate that electrical power is being provided to cap 30. In other embodiments, the display of the user interface includes still another device. By way of example, the display may include a screen or still another system configured to provide a user with system information.

Figure 8C:
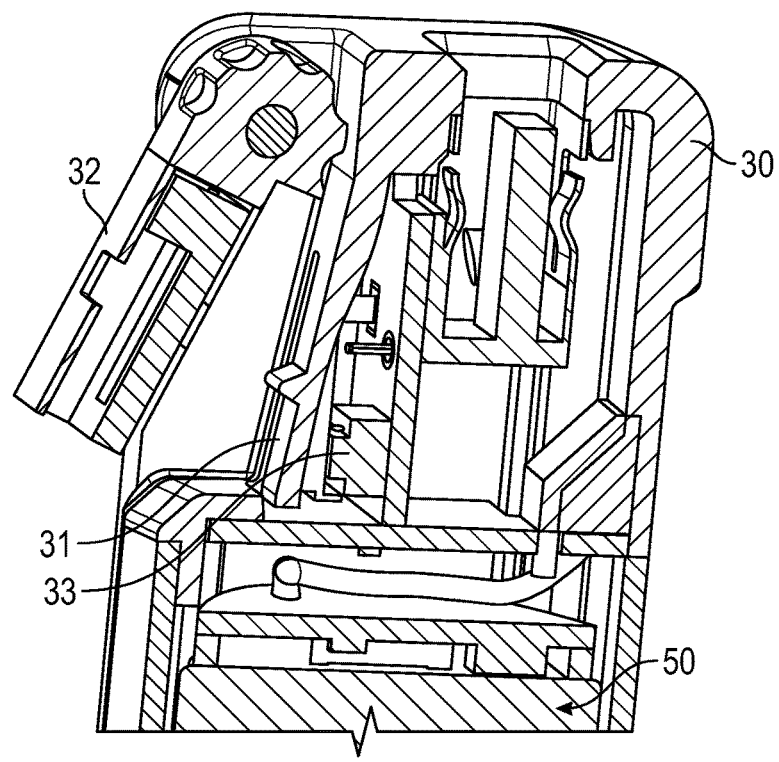

According to the alternative embodiment shown in FIGS. 8B-8C, cap 30 includes an actuator, shown as tab 31, configured to selectively engage a user input device, shown as switch 33. In one embodiment, a user may pivot connector 32 into engagement with tab 31. A user may further press on connector 32 after initial contact with tab 31, thereby deflecting tab 31 and actuating switch 33. Switch 33 may provide similar functionality to button 34, may replace button 34, or may be used to provide still another user input. Accordingly, indicator lights 36 may illuminate to show a current charge level of battery pack 50 after a user engages switch 33 using connector 32 and tab 31. An energy storage and power supply system 10 including tab 31 and switch 33 may not have a separate button 34. In other embodiments, switch 33 may be actuated and produce illumination of indicator lights 36 (e.g., to provide a current charge level of battery pack 50, etc.) while button 34 may be used as an additional control input (e.g., to control another feature or function of energy storage and power supply system 10, etc.).

Referring again to the exemplary embodiment shown in FIGS. 1-8A, a connector, shown as connector 26, is coupled to second end 24 of body 20. Connector 26 may be an electrical connector that is coupled to battery pack 50. According to an exemplary embodiment, energy storage and power supply system 10 is configured (e.g., includes corresponding circuitry, etc.) such that connector 26 facilitates operation of the discharge end. By way of example, electrical energy may flow from the battery pack 50 to a remote device though connector 26.

As shown in FIGS. 1-8A, connector 26 includes a female USB port. A user may insert a male USB connector into connector 26 and utilize the power stored in battery pack 50 to power or charge a remote device. In other embodiments, connector 26 includes a male micro USB connector, a wall socket plug, a female 12V plug (e.g., a socket commonly associated with a cigarette lighter, etc.), or still other components.

In still other embodiments, a plurality of connectors 26 may be coupled to second end 24 of body 20. The connectors 26 may be the same type of connector or different types of connectors, according to various alternative embodiments. By way of example, a female USB connector and a male micro USB connector may be both coupled to second end 24 of body 20. Multiple connectors 26 may facilitate powering or charging multiple remote devices, may improve the flexibility of energy storage and power supply system 10 by allowing the power of battery pack 50 to be utilized via cables available to a user, or may provide still other benefits.

According to an alternative embodiment, connector 26 includes a male connector configured to be plugged into a female port. By way of example, connector 26 may include a male USB connector, a male micro USB connector, a male Lightning connector associated with iPhones and other devices provided by Apple®, or still another male connector type. A user may insert connector 26 directly into the device to be at least one of charged and powered by battery pack 50. A user may also couple the device with energy storage and power supply system 10 using one or more intermediate cables.

In one embodiment, connector 26 is pivotally mounted to body 20. Pivotally mounting connector 26 to body 20 may reduce the risk of damage to connector 26 when not in use (e.g., while transporting energy storage and power supply system 10, etc.). According to the embodiments shown in FIGS. 1-8A, the orientation of connector 26 is fixed relative to body 20. A cover may be disposed over connector 26. Such a cover may reduce the risk of debris or moisture entering connector 26. The cover may slide or otherwise move relative to body 20. In other embodiments, the cover forms a plug that a user removes prior to use.

In one embodiment, energy storage and power supply system 10 includes a processing circuit configured to evaluate whether connector 32 is coupled to a power source. Upon detecting that connector 32 is coupled to the power source, the processing circuit may begin charging battery pack 50 (e.g., begin directing electrical current to one or more battery cells of battery pack 50, etc.) automatically. In other embodiments, the processing circuit is configured to evaluate a characteristic of the electrical power provided by the power source (e.g., an input voltage, an input current, etc.). The processing circuit may be configured to charge battery pack 50 based on a determination that the characteristic exceeds a threshold value (e.g., an input voltage of five volts, an input current of more than between 1 and 2.5 watts, an input current of more than five watts, etc.).

The processing circuit may be configured to utilize a power path management strategy when energy storage and power supply system 10 is coupled to both a power source and an electronic device. By way of example, the processing circuit may determine whether a charge level of the electronic device is below a threshold value (e.g., a ninety five percent charge, etc.). When the charge level is below the threshold value, the processing circuit may be configured to direct incoming electrical power to at least one of power the electronic device and charge a battery of the electronic device. When the charge level is above the threshold value (e.g., the electronic device is already charged, etc.), the processing circuit may be configured to charge battery pack 50.

Figure 9:
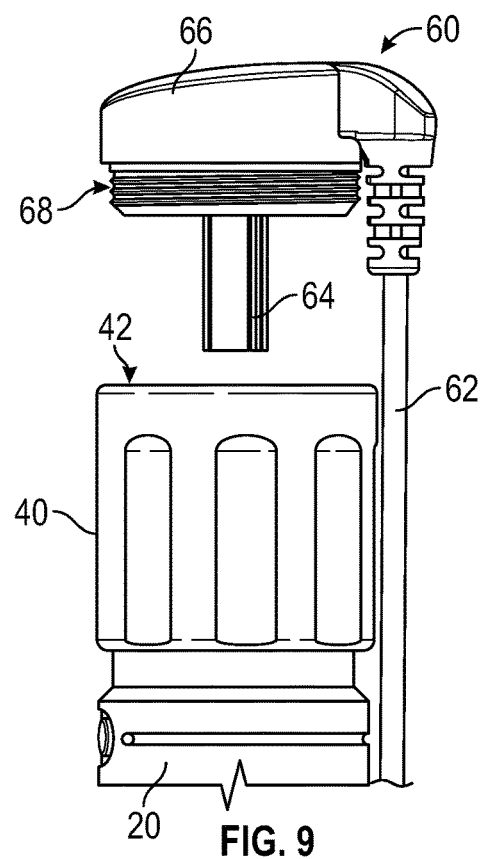
FIGS. 9-12F are perspective views of accessories for use with an energy storage and power supply system, according to various embodiments.
Figure 10:
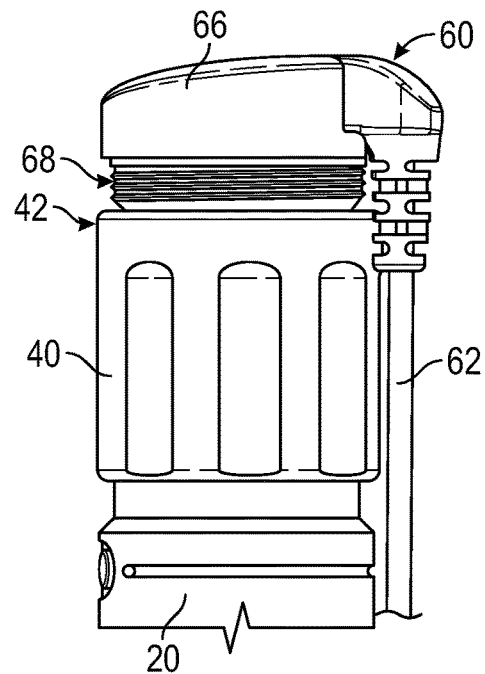
Figure 11:
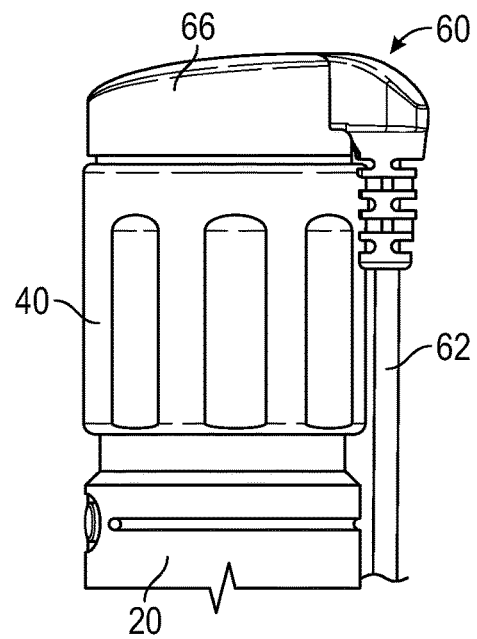

Referring next to FIGS. 9-12C, the discharge end of energy storage and power supply system 10 is shown engaging an accessory 60. In one embodiment, accessory 60 is configured to power a remote device. As shown in FIGS. 9-11, accessory 60 includes a power cable, shown as cable 62, and a connector, shown as connector 64. Cable 62 and connector 64 are attached to a body, shown as body 66. Connector 64 includes a male connector, according to the embodiment shown in FIGS. 9-11. In other embodiments, connector 64 includes a female port.

According to an exemplary embodiment, cable 62 is coupled to a remote device. By way of example, cable 62 may be directly coupled with (e.g., wired into, attached to, etc.) the remote device. In one embodiment, the remote device and energy storage and power supply system 10 are provided as part of a common product family, and the remote device includes accessory 60. According to the embodiment shown in FIG. 12A, cable 62 has a first end coupled to connector 64 and a second end having a connector that may engage a power cable of a remote device, an intermediate cable, or still another component configured to receive electrical power.

As shown in FIGS. 9-11, accessory 60 cooperates with a portion of energy storage and power supply system 10 to secure the joint between connector 64 and a connector of energy storage and power supply system 10 (e.g., connector 26, etc.). By way of example, accessory 60 may be configured to increase the mechanical strength of the connection between connector 64 and connector 26. According to the exemplary embodiment shown in FIGS. 9-11, body 66 includes an engagement portion, shown as engagement portion 68, that is configured to interface with an engagement portion, shown as engagement portion 42, of collar 40 to secure the joint between connector 64 and connector 26.

Referring still to FIGS. 9-11, engagement portion 68 defines a male threaded element. Engagement portion 42 defines a female threaded element configured to receive the male threaded element of engagement portion 68. In other embodiments, engagement portion 68 defines a female threaded element configured to receive a male threaded element of engagement portion 42. According to an alternative embodiment, engagement portion 68 and engagement portion 42 otherwise cooperate to secure the joint between connector 64 and connector 26. By way of example, engagement portion 68 and engagement portion 42 may define a barb and a cooperating notch, another type of twist-to-lock configuration, magnetic elements to secure the joint magnetically, or still another arrangement.

According to an exemplary embodiment, collar 40 is at least one of rotatably and slidably coupled to body 20. By way of example, collar 40 may be a tubular element having an inner volume that receives an axle portion of body 20. Collar 40 defines a central axis, according to an exemplary embodiment, that is coaxial with a central axis defined by body 20. In one embodiment, collar 40 rotates or swivels about the central axis of body 20. Collar 40 may also translate relative to body 20. In one embodiment, collar 40 translates along a longitudinal direction of body 20 between an extended position (e.g., the position shown in FIG. 9, etc.) and a retracted position (e.g., the position shown in FIG. 10, etc.).

As shown in FIGS. 9-11, accessory 60 may be locked into engagement with energy storage and power supply system 10 using collar 40. As shown in FIG. 9, connector 64 may be initially disengaged from a connector of energy storage and power supply system 10 (e.g., connector 26, etc.). From the position shown in FIG. 9, a user may insert connector 64 into a connector of energy storage and power supply system 10 (e.g., connector 26, etc.). In one embodiment, accessory 60 translates as a unit until an intermediate position, shown in FIG. 10, is reached. From the intermediate position, a user may twist collar 40 such that the female threaded element defined by engagement portion 42 receives the male threaded element defined by engagement portion 68. Rotation of collar 40 draws connector 64 further into connector 26, according to an exemplary embodiment, and produces further translational movement of accessory 60 until the components reach the locked position shown in FIG. 11. In other embodiments, collar 40 is not rotatable relative to body 20, and a user may rotate accessory 60 until the components reach the locked position shown in FIG. 11. In such embodiments, the axle portion of body 20 that is received into collar 40 (e.g., the portion of body 20 to which connector 26 is attached, etc.) may be rotatable to accommodate the rotation of accessory 60.

Figure 12A:
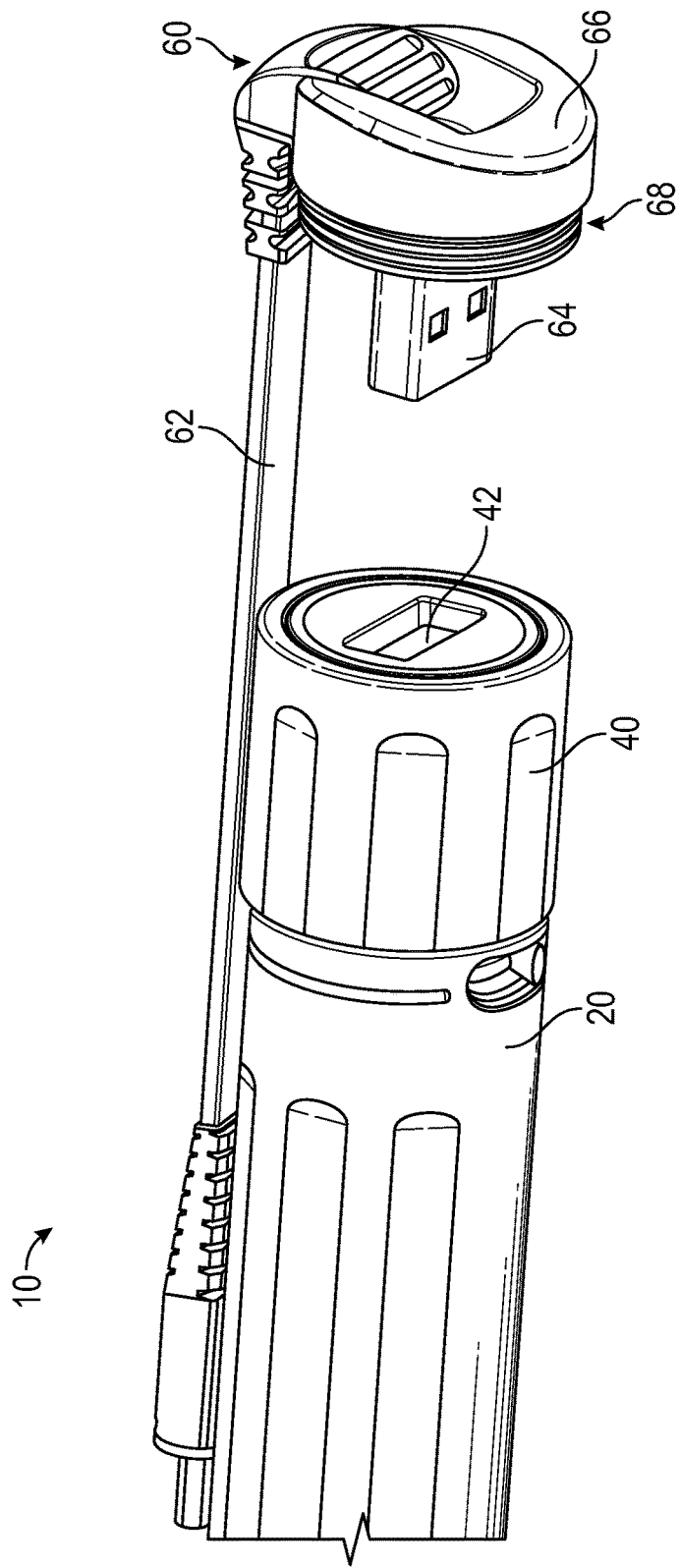
Figure 12B:
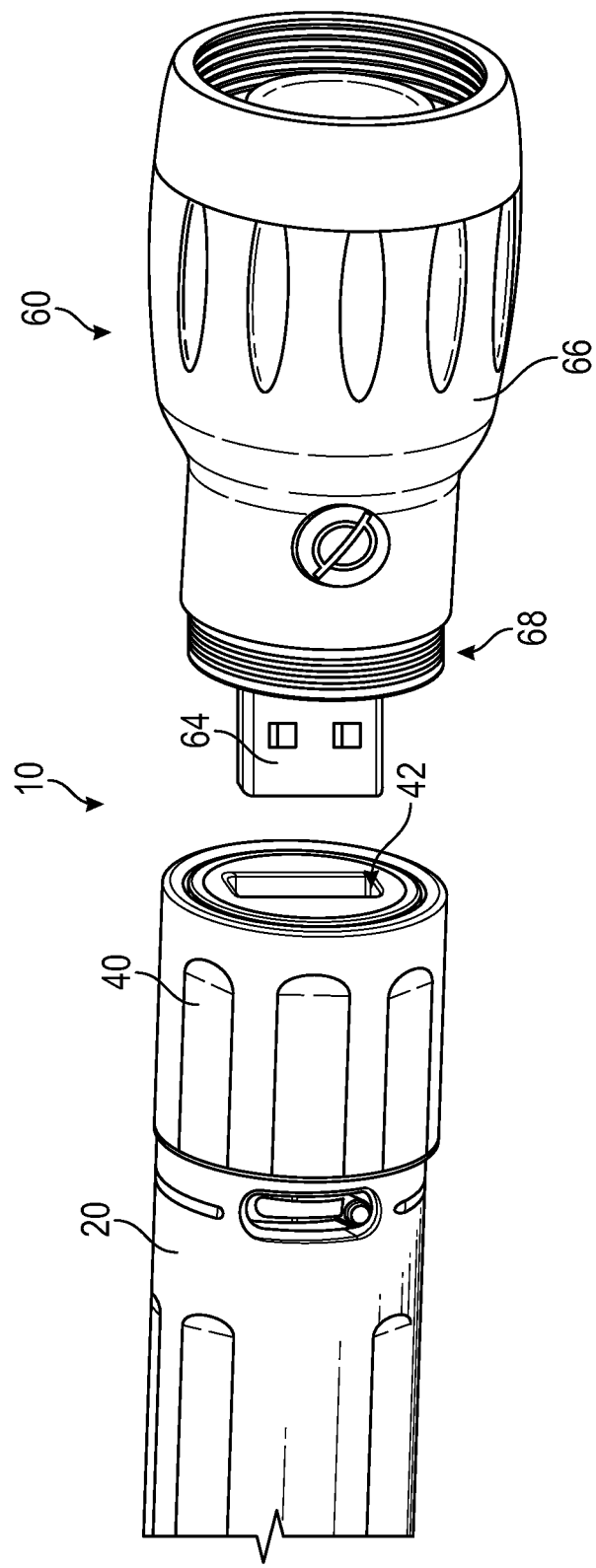
Figure 12C:
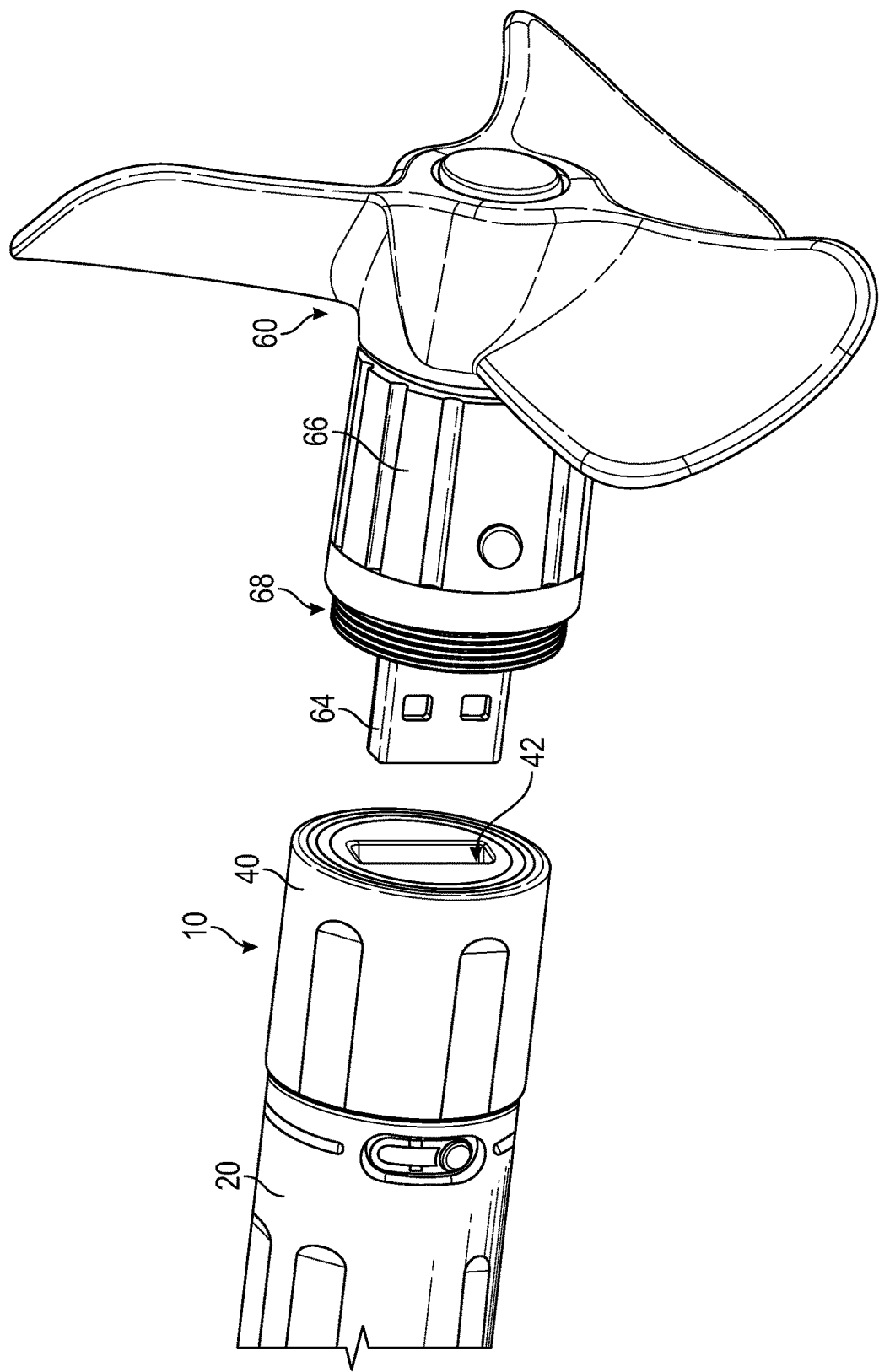

Referring again to FIGS. 12A-12C, accessory 60 may itself include a device configured to be powered by a battery pack of energy storage and power supply system 10. As shown in FIG. 12A, cable 62 may provide electrical energy from battery pack 50 of energy storage and power supply system 10 to a remote device. As shown in FIG. 12B, accessory 60 includes a light source that is powered by battery pack 50 of energy storage and power supply system 10. A user may selectively actuate the light source using a user input device (e.g., button, etc.). As shown in FIG. 12C, accessory 60 includes a fan that is powered by battery pack 50 of energy storage and power supply system 10. A user may selectively actuate the fan using a user input device (e.g., button, etc.). Accessory 60 may include still other devices that may be powered by battery pack 50 of energy storage and power supply system 10, according to various alternative embodiments. By way of example, accessory 60 may include a fire starter, a hand warmer, a tooth brush, a rotary tool having a motor and bits, or still other devices. Accessory 60 may plug into standard USB outlets provided on a computer, provided on a wall adapter, or provided on still another device. As shown in FIGS. 12A-12C, each accessory 60 includes engagement portion 68 that interfaces with collar 40 to secure the connection between connector 64 and connector 26. In other embodiments, some accessories 60 may not include engagement portion 68.

Figure 12D:
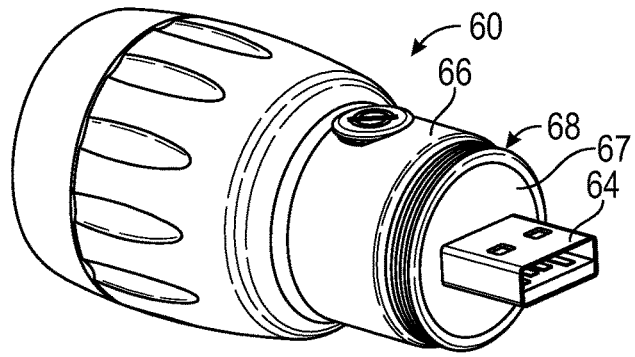
Figure 12E:
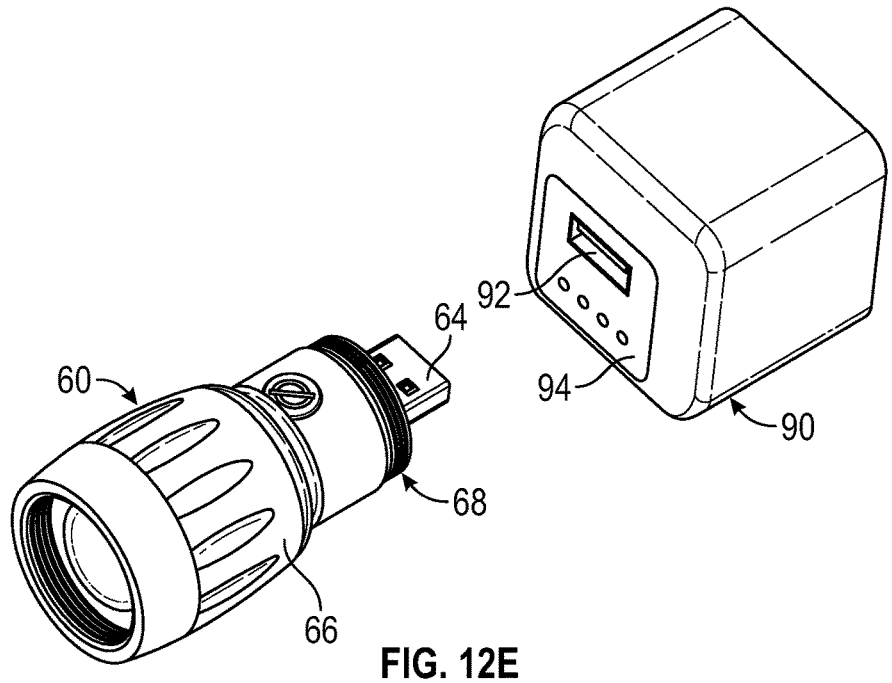
Figure 12F:
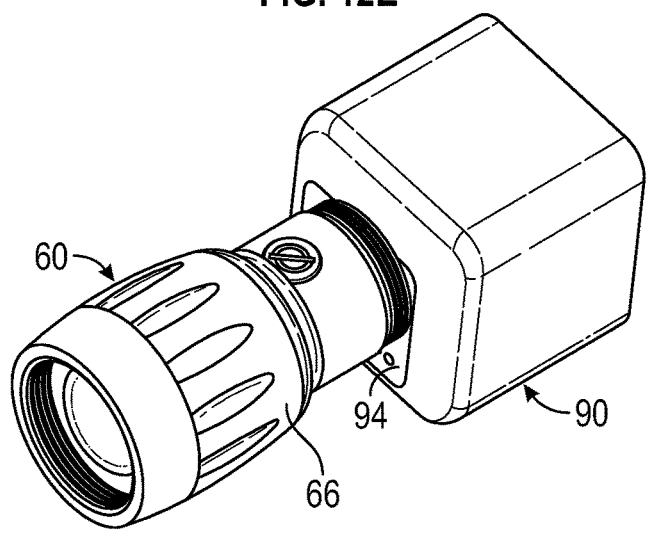

As shown in FIGS. 12D-12F, accessory 60 may selectively engage a standard or traditional power supply device.

By way of example, connector 64 of accessory 60 may be plugged into a standard USB port. As shown in FIGS. 12E-12F, accessory 60 is plugged into a USB port 92 of a traditional wall adapter 90. In one embodiment, body 66 of accessory 60 includes a surface 67 configured to facilitate engagement of accessory 60 with standard female USB ports. As shown in FIG. 12D, surface 67 is flat and free of obstructions that may otherwise keep accessory 60 from plugging into a standard USB port. The surface 67 may be flat to correspond with a flat surface 94 of the traditional wall adapter 90.

Figure 13:
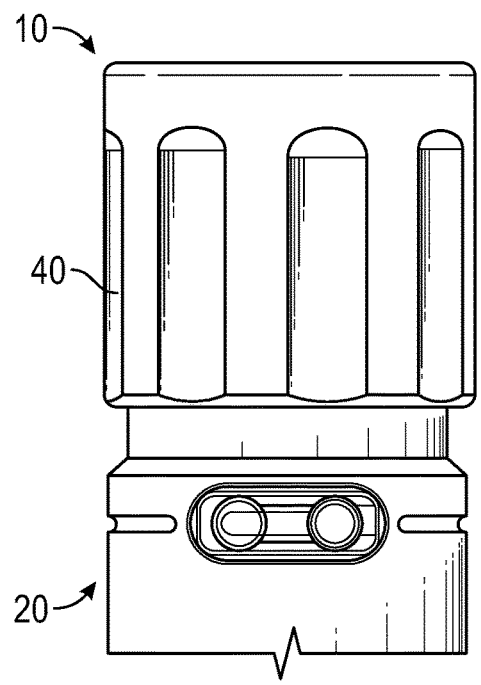
FIGS. 13-14 are perspective views of a collar for an energy storage and power supply system in an extended position and a retracted position, according to an exemplary embodiment.
Figure 14:
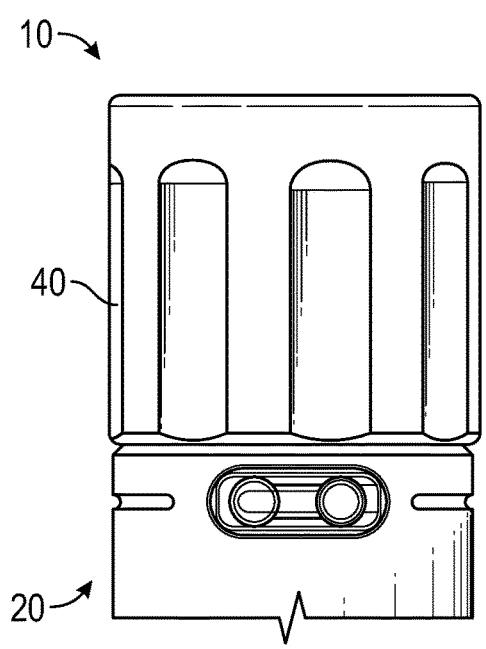
Figure 15:
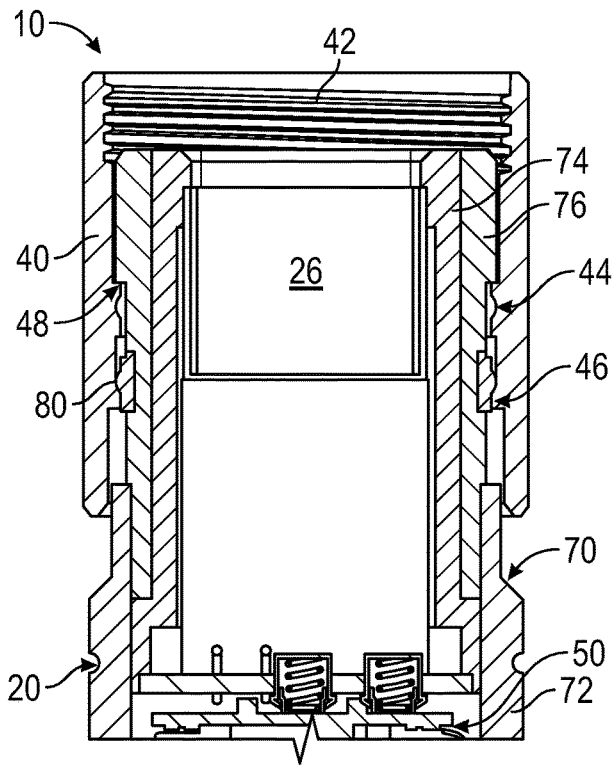
FIGS. 15-16 are cross-sectional views of a collar for an energy storage and power supply system in an extended position and a retracted position, according to an exemplary embodiment.
Figure 16:
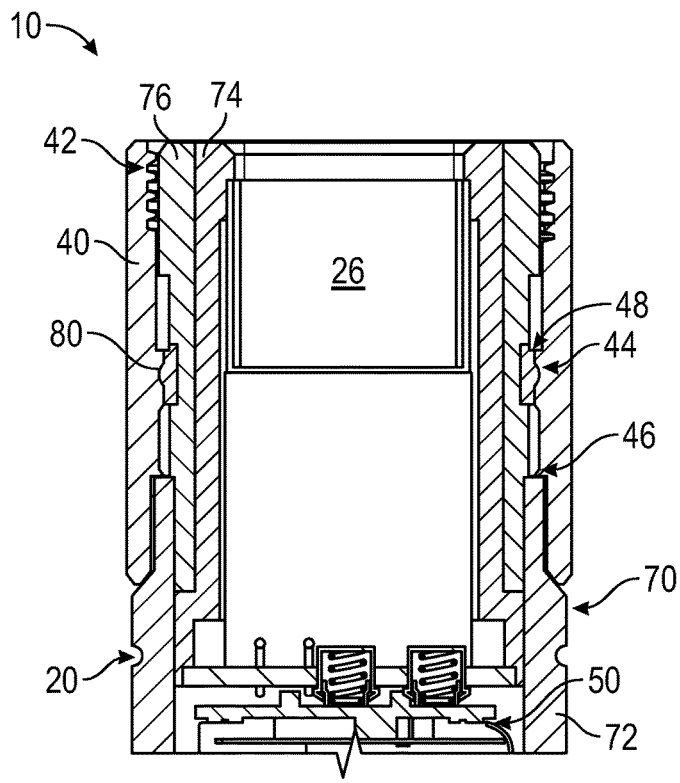

Referring next to FIGS. 13-16, collar 40 may translate relative to body 20 between an extended position shown in FIGS. 13 and 15 and a retracted position shown in FIGS. 14 and 16. According to an exemplary embodiment, collar 40 may be retained in at least one of the extended position and the retracted position (e.g., for storage when not in use, etc.). Energy storage and power supply system 10 may include a mechanical locking mechanism, a magnetic locking mechanism, or still another device configured to retain collar 40.

As shown in FIGS. 15-16, body 20 includes an assembly 70 of structural components. According to an exemplary embodiment, assembly 70 includes a tube, shown as base tube 72, that extends along the length of energy storage and power supply system 10 between the charging end and the discharge end. A second component, shown as connector support 74, is coupled to base tube 72 and engages connector 26. As shown in FIGS. 15-16, a tube, shown as axle tube 76, is coupled to connector support 74. At least two of base tube 72, connector support 74, and axle tube 76 may be coupled together (e.g., with a press-fit connection, adhesively secured, etc.). In other embodiments, at least two of base tube 72, connector support 74, and axle tube 76 are integrally formed and define a single unitary body. According to an exemplary embodiment, collar 40 is rotatable relative to base tube 72, connector support 74, and axle tube 76. In other embodiments, connector support 74 is rotatable relative to base tube 72, axle tube 76, and collar 40.

According to an exemplary embodiment, energy storage and power supply system 10 includes a mechanical locking mechanism configured to retain collar 40 in at least one of the extended position and the retracted position. By way of example, the locking mechanism may be configured to retain collar 40 out of the way when a non-specialized connector assembly (e.g., a standard USB product, etc.) is used with energy storage and power supply system 10. As shown in FIGS. 15-16, the locking mechanism of energy storage and power supply system 10 includes a retainer, shown as o-ring 80, that is configured to hold collar 40 in the retracted position.

According to an exemplary embodiment, o-ring 80 includes a flexible material (e.g., silicone rubber, etc.). O-ring 80 includes a base portion received into a slot defined by axle tube 76 and a protrusion configured to selectively engage a portion of collar 40, according to an exemplary embodiment. In other embodiments, o-ring 80 has a circular cross-sectional shape, an inner portion of o-ring 80 received into a slot defined by axle tube 76 and an outer portion of o-ring 80 configured to selectively engage a portion of collar 40.

A user may retract collar 40 from the extended position shown in FIGS. 13 and 15. Translation of collar 40 may continue until o-ring 80 engages a locking portion 44 of collar 40. The locking portion 44 may define a pair of rings sized to deform o-ring 80. As shown in FIG. 16, o-ring 80 may expand within a region between the pair of rings and cooperate with locking portion 44 to retain collar 40 in the retracted position. In one embodiment, the locking portion 44 and o-ring 80 are shaped and sized such that deformation of o-ring 80 requires a preferred amount of force (e.g., such that collar 40 is retained in the retracted position when a pulling force below a threshold is applied, etc.). A user may pull collar 40 from the position shown in FIG. 16, whereby one of the rings (e.g., the ring closer to the end of base tube 72, etc.) defined by locking portion 44 deforms o-ring 80 to allow further extension of collar 40. A user may continue to pull collar 40 until the extended position shown in FIGS. 13 and 15 is reached, whereby o-ring 80 may engage a retainer 46 of collar 40, and an edge 48 of collar 40 engages axle tube 76 to prevent further translational movement. In other embodiments, collar 40 does not include edge 48, and the application of a pulling force may cause retainer 46 to deform o-ring 80 such that collar 40 may be selectively removed.

Figure 17A:
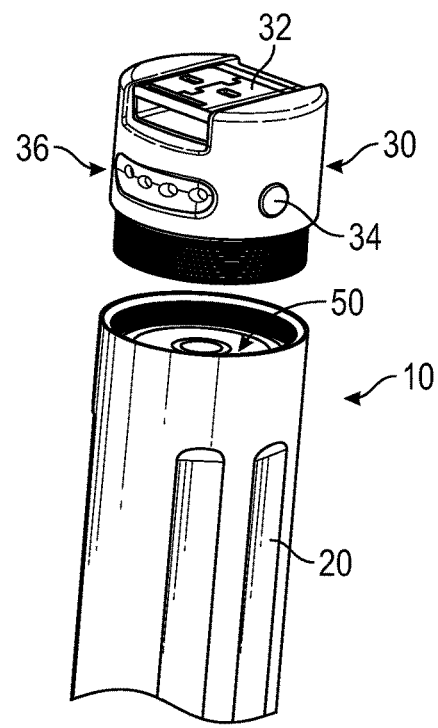
FIGS. 17A-17B are perspective views of an energy storage and power supply system having a charging cap, according to alternative embodiments.
Figure 17B:
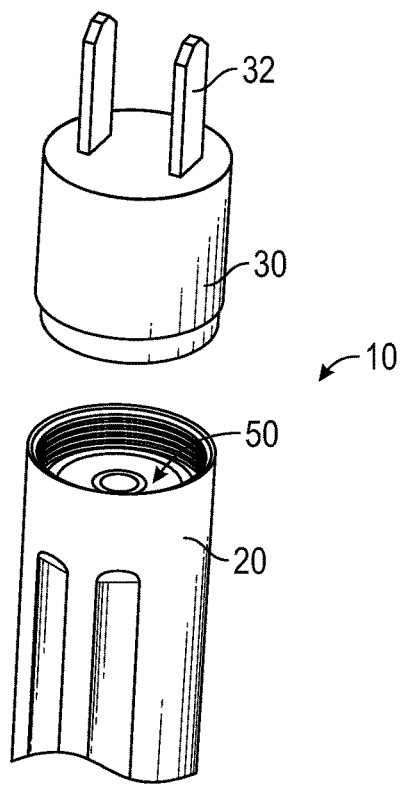
Figure 18:
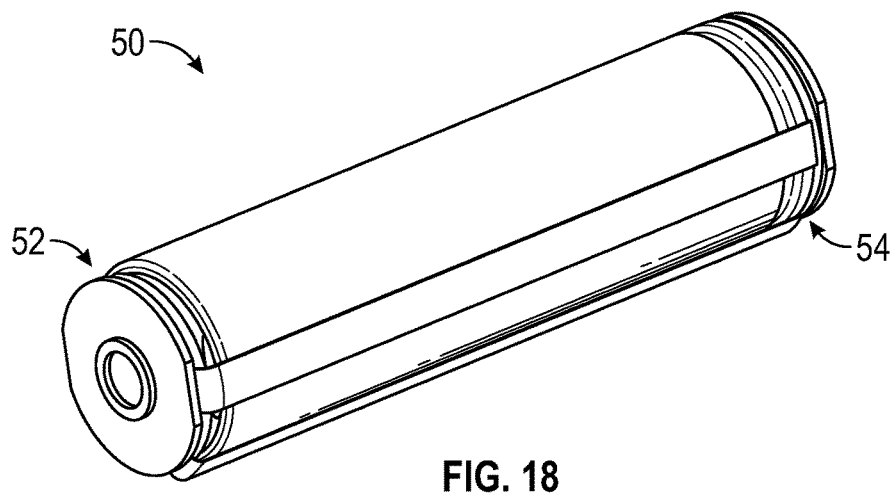
Figure 19A:
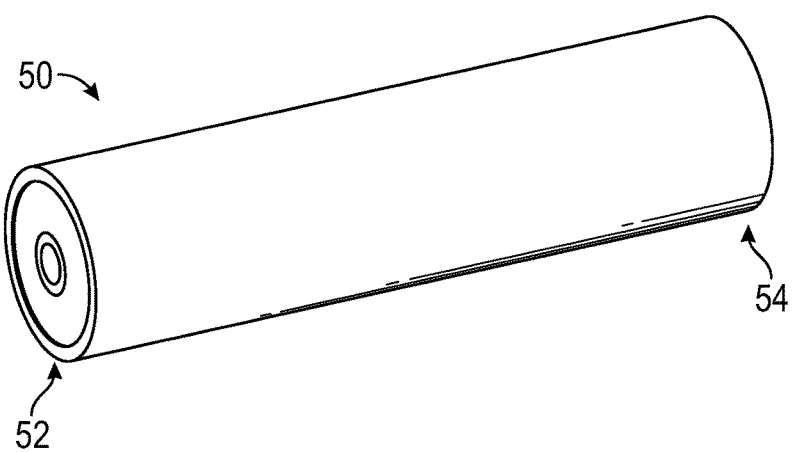
Figure 19B:
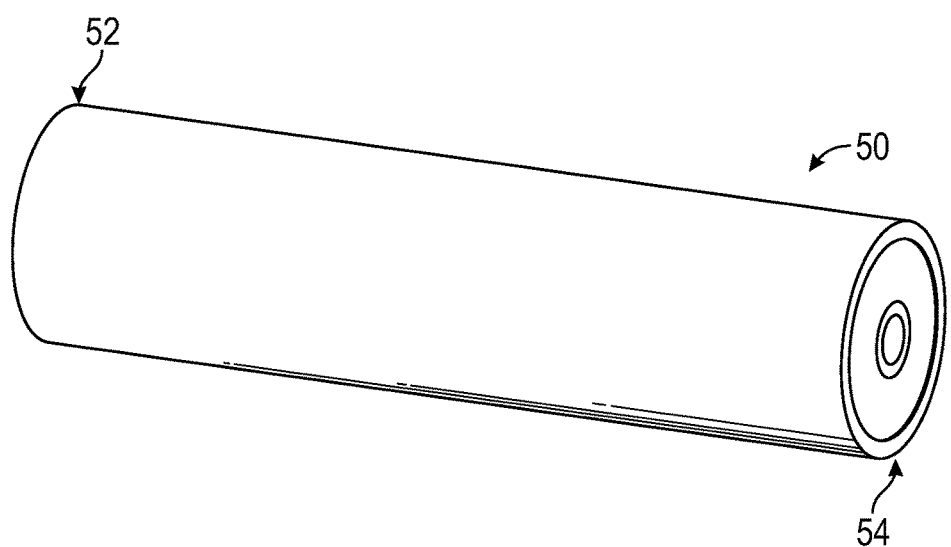
Figure 20A:
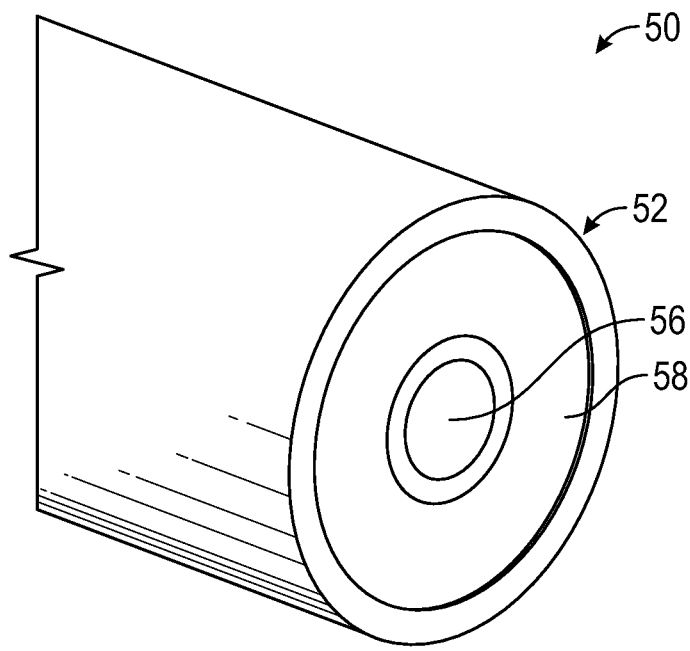
Figure 20B:
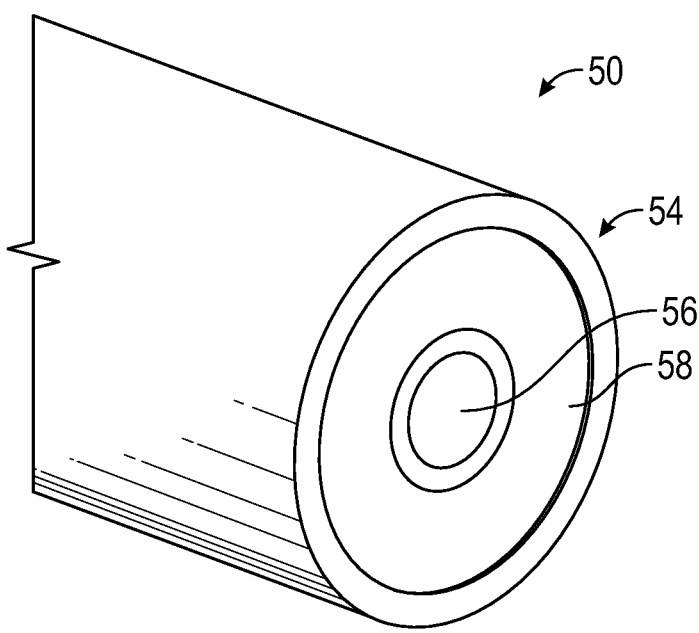

According to the exemplary embodiment shown in FIGS. 17A-17B, battery pack 50 is disposed within body 20 and configured to be charged using cap 30. As shown in FIG. 17A, connector 32 includes a male USB connector. As shown in FIG. 17B, connector 32 includes a pair of AC prongs. In other embodiments, connector 32 includes a 12V male connector or still another device.

Referring next to FIGS. 18-21B, battery pack 50 includes a plurality of components that may be received within body 20 of energy storage and power supply system 10. As shown in FIGS. 18-20B, battery pack 50 has a first end 52 and an opposing second end 54. According to an exemplary embodiment, battery pack 50 includes various components configured to provide both a positive pole, shown as positive pole 56, and a negative pole, shown as negative pole 58, at each of first end 52 and opposing second end 54. As shown in FIGS. 20A-20B, positive pole 56 is disposed along a centerline of battery pack 50, and negative pole 58 is annular and surrounds positive pole 56. In other embodiments, negative pole 58 is disposed along a centerline of battery pack 50, and positive pole 56 is annular and surrounds negative pole 58. In still other embodiments, positive pole 56 and negative pole 58 have still another shape or configuration.

According to an exemplary embodiment, positive poles 56 are disposed in the same or similar locations on first end 52 and opposing second end 54 of battery pack 50, while the negative poles 58 are disposed in the same or similar locations on first end 52 and opposing second end 54 of battery pack 50. Such a configuration of battery pack 50 allows a user to insert either first end 52 or opposing second end 54 of battery pack 50 into a portable device (e.g., energy storage and power supply system 10, etc.) without impacting the operation thereof. Accordingly, battery pack 50 removes the risk that a user may insert battery pack 50 backwards. Further, a user need not be educated (e.g., with diagrams, etc.) on how to properly install battery pack 50 because battery pack 50 may be inserted in either of two orientations. In one embodiment, a device includes a plurality of battery packs 50, which may each be inserted into the device in various combinations of orientations without impacting the operation of the device.

Figure 21A:
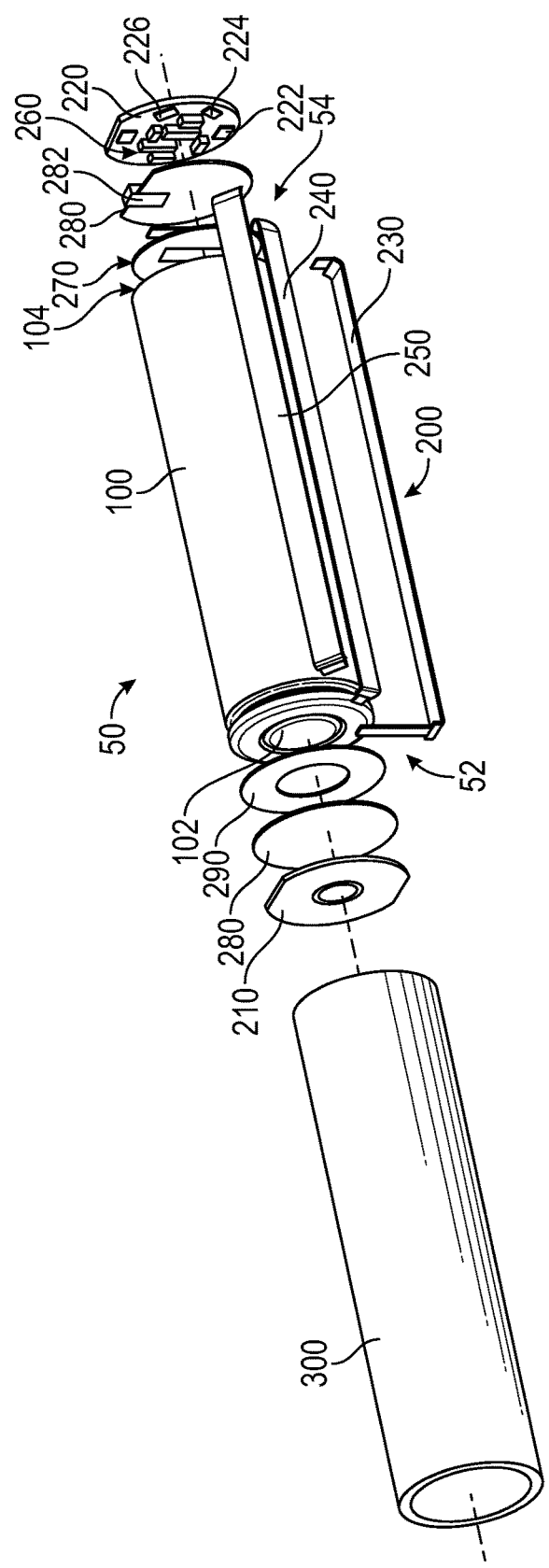
Figure 21B:
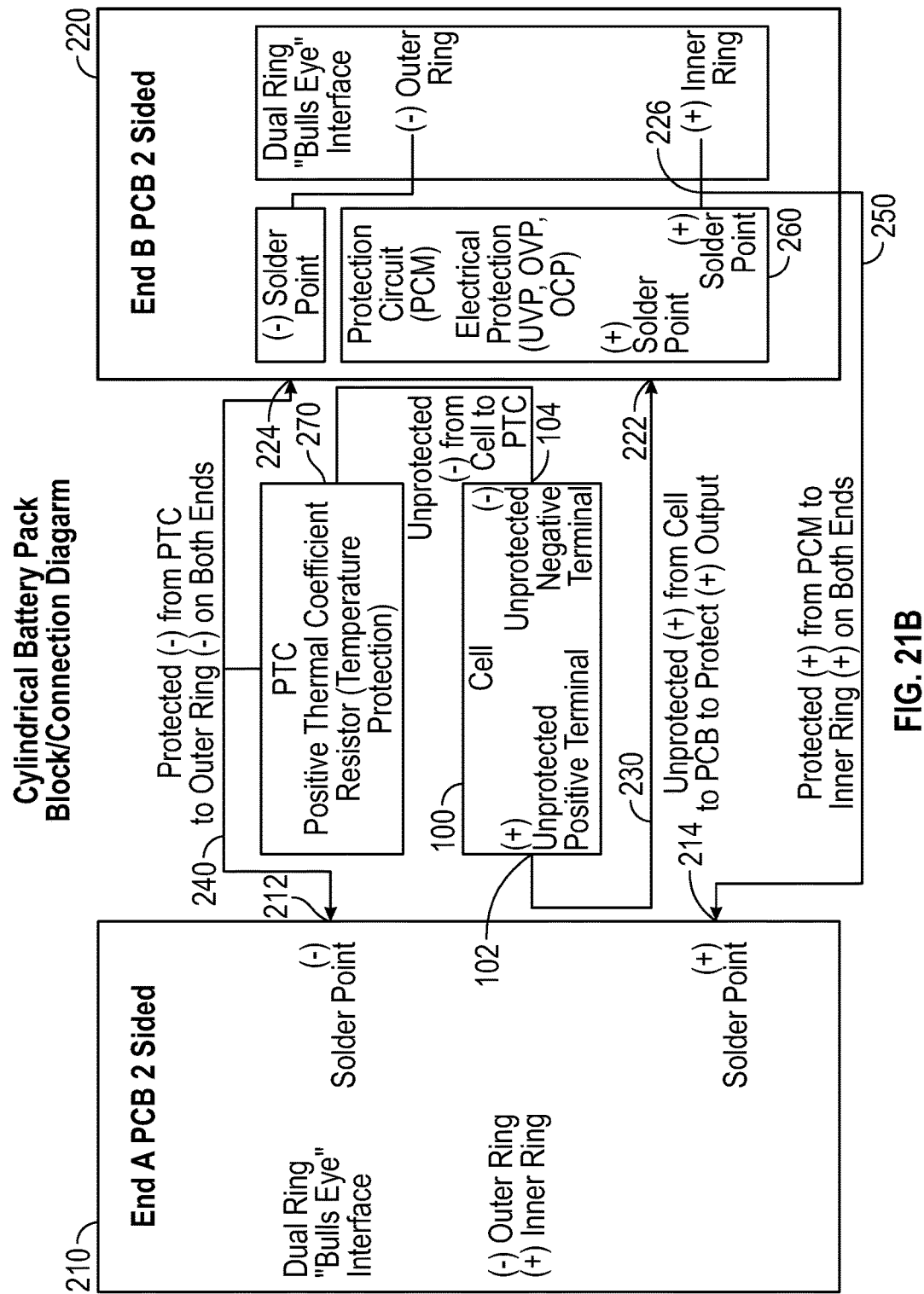
FIG. 21B is a schematic layout for a battery pack, according to an exemplary embodiment.

As shown in FIGS. 21A-21B, battery pack 50 includes a cell, shown as cell 100, having a dedicated positive button 102 and a dedicated negative terminal 104. In one embodiment, cell 100 includes a rechargeable cell. By way of example, the rechargeable cell may include a rechargeable 18650 cell, a rechargeable 26650 cell, or a rechargeable cell of still another size. In other embodiments, battery pack 50 includes a plurality of cells 100 electrically coupled in series or in parallel. The rechargeable 18650 cell may include a lithium-ion cell or may include other standard cells used for various applications. Cell 100 may also include cells having other chemistries (e.g., NiCad, etc.). Battery pack 50 includes a conversion assembly, shown as conversion assembly 200, that converts cell 100, a standard device, into a dual-ring device having positive and negative poles on both ends thereof, according to the exemplary embodiment shown in shown in FIGS. 21A-21B.

As shown in FIGS. 21A-21B, conversion assembly 200 of battery pack 50 includes a first printed circuit board (PCB), shown as first PCB 210, and a second PCB, shown as second PCB 220. In one embodiment, first PCB 210 and second PCB 220 have outer sides that provide the positive and negative poles at first end 52 and opposing second end 54 of battery pack 50. Second PCB 220 has an opposing inner side that includes an unprotected positive contact 222, a negative contact 224, and a protected positive contact 226, according to the embodiment shown in FIGS. 21A-21B.

According to the exemplary embodiment shown in FIGS. 18-21B, battery pack 50 includes various straps that extend along the length of cell 100. Certain straps are coupled to dedicated positive button 102 and dedicated negative terminal 104 of cell 100. As shown in FIG. 21A, unprotected positive contact 222, negative contact 224, and protected positive contact 226 are configured to be coupled to a first strap 230, a second strap 240, and a third strap 250, respectively. First strap 230, second strap 240, and third strap 250 include electrical conductors and are thereby configured to electrically couple various components of battery pack 50. According to an exemplary embodiment, first strap 230 couples dedicated positive button 102 of cell 100 to the positive pole of opposing second end 54 of battery pack 50 (e.g., via unprotected positive contact 222 and second PCB 220, etc.). According to an exemplary embodiment, second strap 240 couples dedicated negative terminal 104 of cell 100 to the negative pole of first end 52 (e.g., via first PCB 210 and second PCB 220, etc.).

As shown in FIGS. 21A-21B, conversion assembly 200 includes a protection circuit module 260. Protection circuit module 260 may be provided as part of second PCB 220. Protection circuit module 260 has an input coupled to dedicated positive button 102 of cell 100 (e.g., via first strap 230, etc.) and an output coupled to the positive poles of battery pack 50. The third strap 250 couples the output of protection circuit module 260 to the positive pole of first end 52 of battery pack 50, according to an exemplary embodiment. As shown in FIG. 21B, second strap 240 is coupled to a negative contact 212 on the inside of first PCB 210, and third strap 250 is coupled to a protected positive contact 214 on the inside of first PCB 210. As shown in FIGS. 21A-21B, conversion assembly 200 includes a temperature protection device, shown as positive thermal coefficient resistor 270, that is configured to adjust an output current based on the temperature of cell 100. In one embodiment, positive thermal coefficient resistor 270 has an input that is coupled to dedicated negative terminal 104 of cell 100 and an output coupled to the negative poles of battery pack 50 (e.g., via first PCB 210 and second PCB 220, etc.). As shown in FIG. 21A, conversion assembly 200 includes a pair of insulators 280. Insulators 280 may also include an adhesive to facilitate physically coupling the components of battery pack 50. Insulator 280 positioned at opposing second end 54 of battery pack 50 includes a contact 282 electrically coupling positive thermal coefficient resistor 270 to second PCB 220. A spacer, shown as spacer 290, is disposed between insulator 280 and cell 100 at first end 52. As shown in FIG. 21A, spacer 290 is annular and exposes dedicated positive button 102. A cover, shown as cover 300, may surround and protect various components of battery pack 50. In one embodiment, cover 300 is manufactured from an insulating material.

According to an exemplary embodiment, battery pack 50 includes charging electronics, protection circuitry, or still other components configured to facilitate operation of battery pack 50 within a device. Accordingly, battery pack 50 may be removed from one device for use in another device without regard for whether either device includes dedicated charging electronics or protection circuitry. Battery pack 50 thereby simplifies the design of portable electronic devices by removing the requirement of including dedicated charging electronics or protection circuitry.

Figure 22:
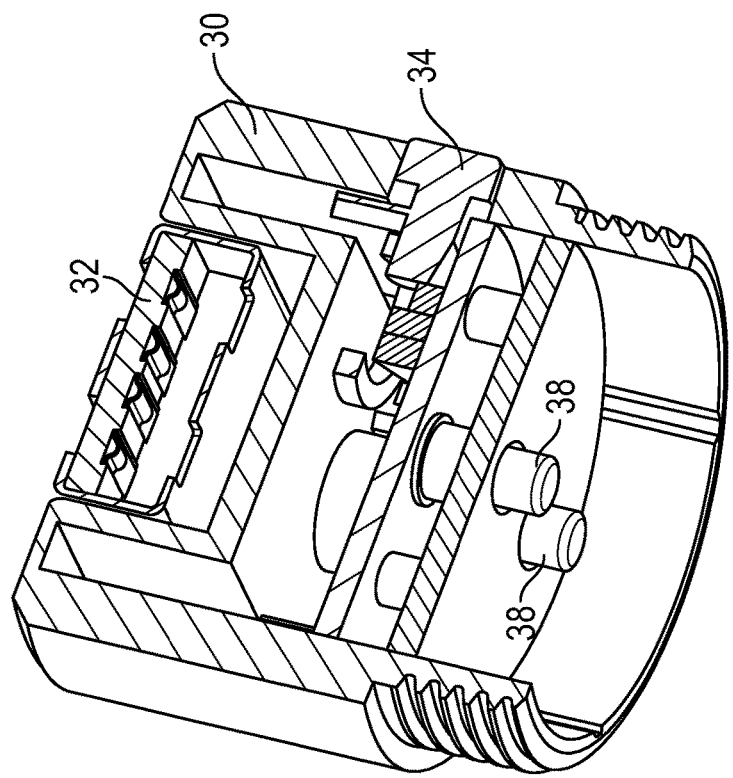
FIG. 22 is a perspective view of a charging cap for an energy storage and power supply system, according to an exemplary embodiment.

As shown in FIG. 22, cap 30 includes a first set of pogos, shown as pogos 38. A pogo may be or include an electrical contact and a resilient member (e.g., a spring, etc.) positioned to translate or extend the electrical contact from a reference surface. A pogo may thereby electrically couple various devices even when such devices are positioned at different distances from one another. In one embodiment, the pogo is at least one of shaped, configured, and positioned to maintain electrical continuity between the battery pack 50 and the connector 32 regardless of the relative orientations thereof. In one embodiment, pogos 38 include spring-loaded electrical contacts configured to interface with the positive and negative poles defined by battery pack 50. According to the exemplary embodiment shown in FIG. 22, a first pogo 38 is disposed along a central axis of cap 30 and is configured to engage the positive pole of battery pack 50 while a second pogo 38 is radially spaced from the first pogo 38 and is configured to engage the negative pole (e.g., ring, annulus, etc.) of battery pack 50. Resilient members of pogos 38 may drive the electrical contacts into engagement with the battery pack 50. Pogos 38 may thereby advantageously maintain continuity between the battery pack 50 and the connector 32 even if relative motion between cap 30 and body 20 occurs (e.g., even if cap 30 is partially unscrewed from or rotated relative to body 20, even if cap 30 is partially withdrawn from body 20, even if body 20 is partially withdrawn from cap 30, etc.). Maintaining continuity between the battery pack 50 and the connector 32 may be particularly important where energy storage and power supply system 10 is used in mobile and/or outdoor applications, where slight relative movement may break the electrical connectivity provided by traditional contact configurations. As battery pack 50 includes positive and negative poles disposed in the same or similar locations on first end 52 and opposing second end 54, pogos 38 may engage first end 52 or opposing second end 54 of battery pack 50.

According to an exemplary embodiment, a first set of spring-loaded pogos are electrically coupled with connector 26, and a second set of spring-loaded pogos are electrically coupled with connector 32. The first set of spring-loaded pogos engages first end 52 of battery pack 50, and the second set of spring-loaded pogos engages opposing second end 54 of battery pack 50, according to an exemplary embodiment. In one embodiment, the second set of spring-loaded pogos is also electrically coupled to electronic circuitry associated with the user interface of energy storage and power supply system 10 (e.g., associated with button 34, associated with indicator lights 36, etc.).

Figure 23A:
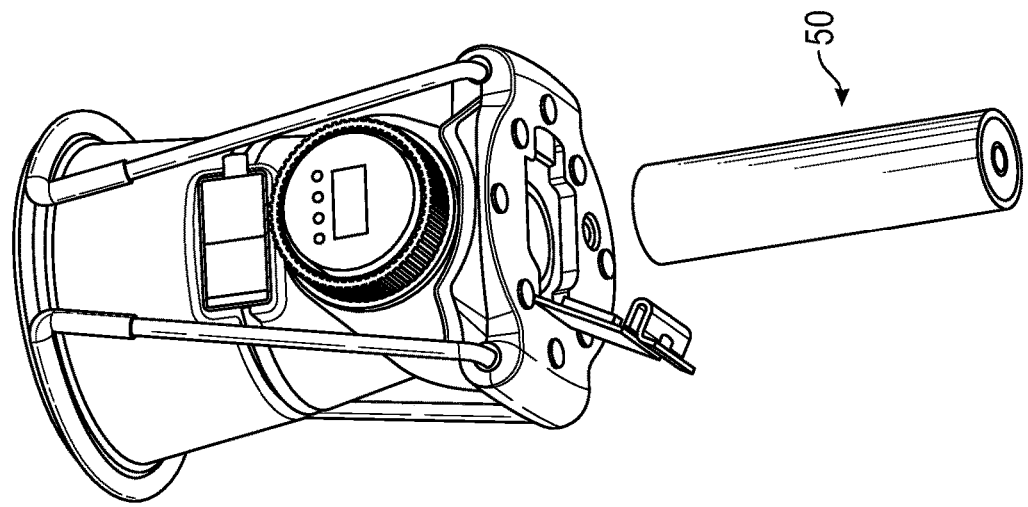
FIGS. 23A-23B are perspective views of a battery pack for use with portable electronic devices, according to various embodiments.
Figure 23B:
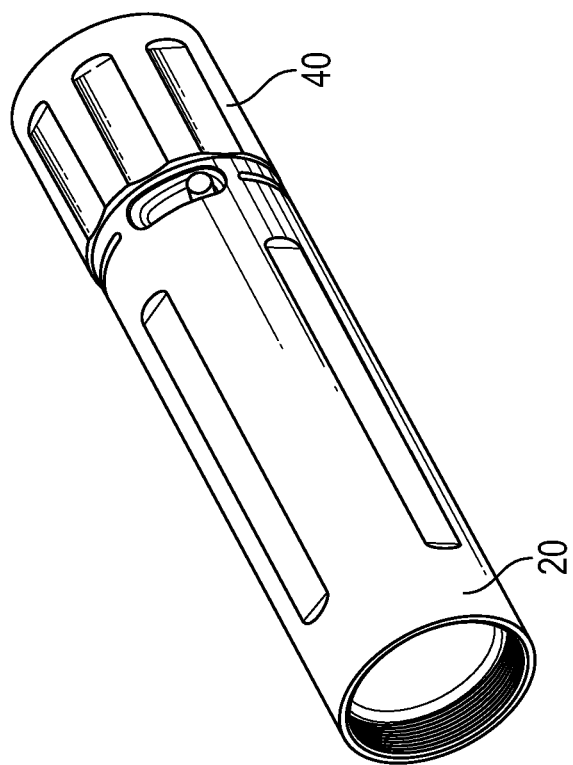
Figure 23B:
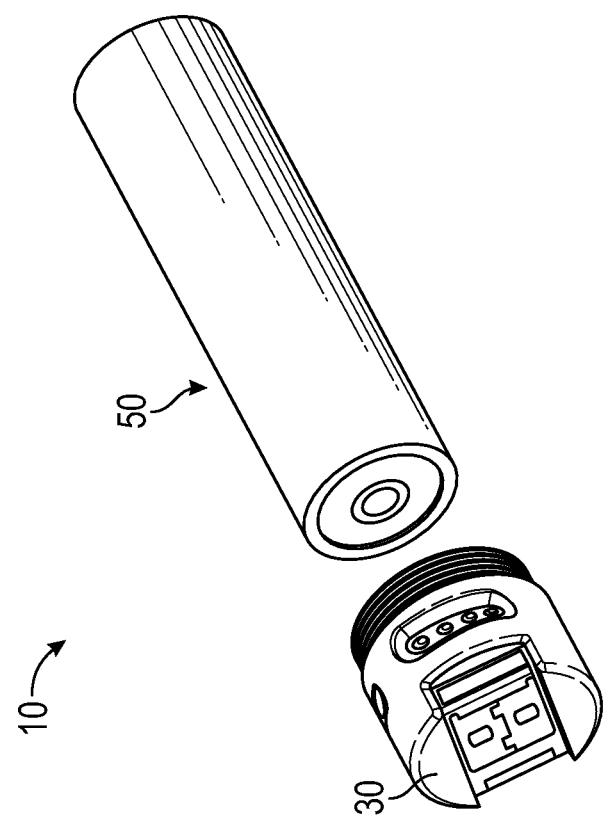

As shown in FIGS. 23A-23B, battery pack 50 forms a modular assembly that may be used to power various devices. As shown in FIG. 23A, the same battery pack 50 may be inserted into a lantern device. Battery pack 50 may power the lantern device, may be charged using one more power inputs of the lantern device, or may power an external device using one or more power outputs of the lantern device, according to various alternative embodiments. As shown in FIG. 23B, the same battery pack 50 may be received into body 20 of energy storage and power supply system 10. In other embodiments, battery pack 50 is received into still another portable electronic device (e.g., a flashlight, etc.) or provided for use with another device (e.g., a home station used to charge one or more battery packs 50, etc.).

Figure 24A:
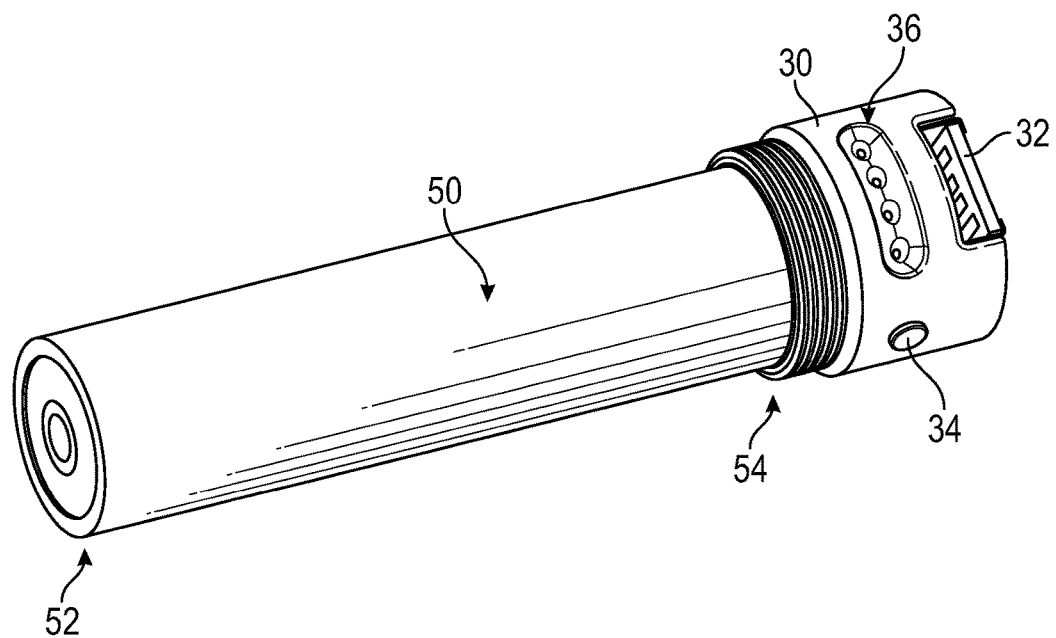
FIGS. 24A-24D are perspective views of a battery pack, charging caps, and discharge ends, according to various embodiments.
Figure 24B:
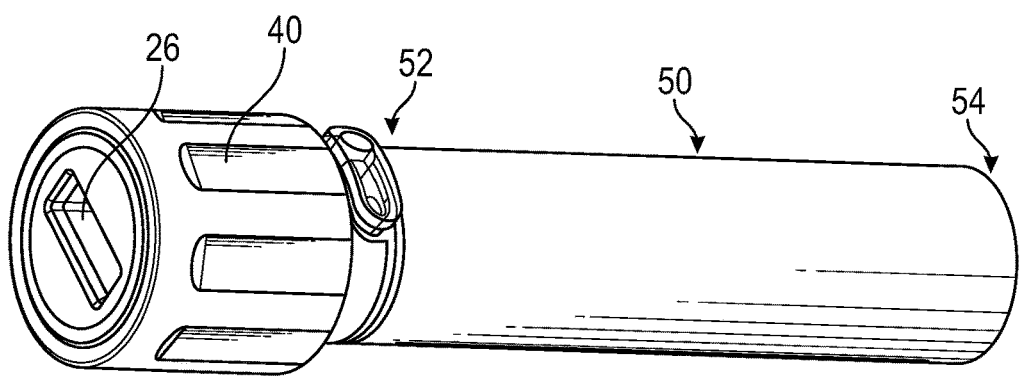
Figure 24C:
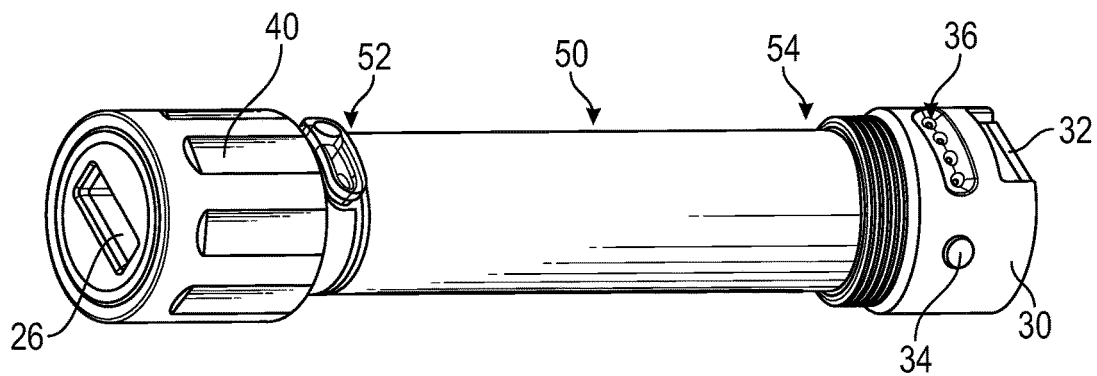
Figure 24D:
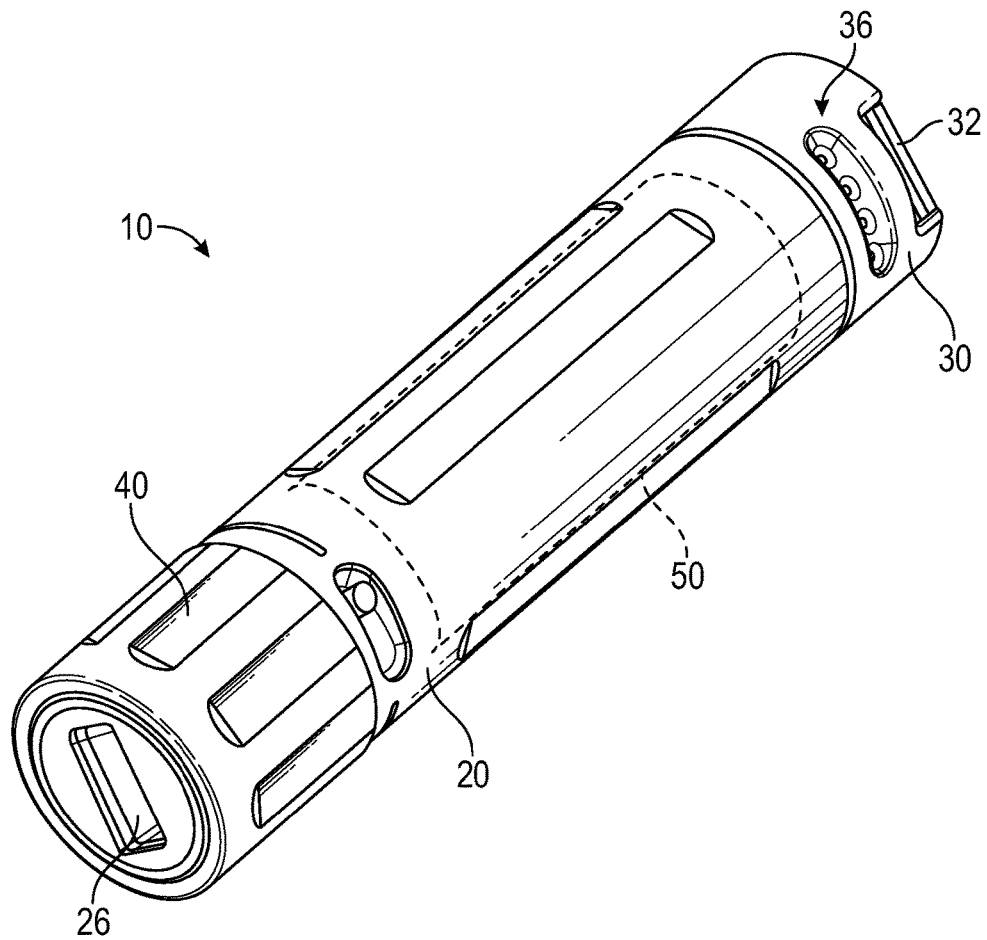

As shown in FIGS. 24A-24D, one or both ends of battery pack 50 may be utilized in a portable device. As shown in FIG. 24A, cap 30 defines a charging end that is coupled to an end (e.g., opposing second end 54) of battery pack 50. When connector 32 is plugged in (e.g., to a female USB port, etc.), cap 30 may be used to independently charge battery pack 50 and check a voltage associated therewith. As shown in FIG. 24B, electrical power may be independently drawn from battery pack 50 (e.g., from first end 52 of battery pack 50, etc.). By way of example, power may be drawn from battery pack 50 once a USB device is plugged coupled to connector 26. As shown in FIG. 24C, a discharge element (e.g., connector 26, etc.) and a charging element (e.g., connector 32 of cap 30, etc.) are coupled to opposing ends of battery pack 50. In one embodiment, the configuration of battery pack 50 facilitates charging (e.g., using connector 32, etc.) and discharging (e.g., using connector 26) battery pack 50 at the same time. Energy storage and power supply system 10, which may charge battery pack 50 and has a power output (e.g., via connector 26, etc.), is shown in FIG. 24D. Battery pack 50 having positive poles 56 and negative poles 58 disposed at both first end 52 and opposing second end 54 facilitates the design of portable electronic devices at least by eliminating the numerous wires that commonly extend along the length of the device, past the cells, to engage various switches, circuits, or other components.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems, and/or program products on any machine-readable media for accomplishing its operations. The embodiments of the present disclosure may be implemented using an existing computer processor, or by a special purpose computer processor incorporated for this or another purpose or by a hardwired system. Any type of processor may be used (e.g., FPGA, ASIC, ASIP, CPLD, SDS, etc.). No element, component, or method step in the present disclosure is intended to be dedicated to the public, regardless of whether the element, component, or method step is explicitly recited in the claims.

As noted above, embodiments within the scope of the present disclosure may include program products including machine-readable media for carrying or having machine-executable instructions or data structures stored thereon. Such machine-readable media can be any available media, which can be accessed by a general purpose or special purpose computer or other machine with a processor. By way of example, such machine-readable media can comprise RAM, ROM, EPROM, EEPROM, CD ROM or other optical disk storage, magnetic disk storage or other magnetic storage devices, or any other medium (e.g., non-transitory medium) which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data, which cause a general-purpose computer, special purpose computer, or special purpose processing machine to perform a certain function or group of functions.

Embodiments of the disclosure may be described in the general context of method steps, which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. An energy storage and power supply system, comprising:
   a body having a first end and an opposing second end;
   a battery pack disposed within the body;
   a first connector disposed at the first end of the body and electrically coupled to the battery pack, wherein the first connector comprises a male connector configured to receive electrical power to charge the battery pack;
   a second connector disposed at the opposing second end of the body and electrically coupled to the battery pack, wherein the second connector comprises a female connector configured to provide a power output from the battery pack; and
   a collar slidably coupled to the opposing second end of the body and movable between an extended position and a retracted position, the collar configured to engage with and thereby retain an accessory when selectively reoriented into the extended position.

2. The energy storage and power supply system of claim 1, wherein the female connector comprises a female USB connector, wherein the opposing second end of the body defines a surface around an inlet of the female USB connector, and wherein the surface defined by the body is flat.

3. The energy storage and power supply system of claim 2, further comprising an accessory having a male USB connector configured to engage with and receive power from the female USB connector, wherein the accessory comprises at least one of a USB charging cable, a fan, a light, a fire starter, a hand warmer, a tooth brush, and a rotary tool.

4. The energy storage and power supply system of claim 3, wherein the accessory includes a housing, wherein the housing defines a second surface at least partially surrounding the male USB connector, and wherein the second surface defined by the housing is flat.

5. The energy storage and power supply system of claim 4, wherein the collar includes an engagement portion defining at least one of a male threaded element and a female threaded element, the at least one of the male threaded element and the female threaded element configured to engage with a corresponding engagement portion of the accessory.

6. The energy storage and power supply system of claim 1, further comprising an o-ring positioned between the body and the collar, wherein the collar defines a locking portion, and wherein the o-ring is configured to engage the locking portion to selectively retain the collar in the retracted position.

7. An energy storage and power supply system, comprising:
   a body;
   a battery pack disposed within the body and having a first end and an opposing second end;
   a first connector electrically coupled to the first end of the battery pack, wherein the first connector comprises a male connector configured to receive electrical power to charge the battery pack;
   a second connector electrically coupled to the opposing second end of the battery pack, wherein the second connector comprises a female connector configured to provide a power output to an accessory from the battery pack; and
   a collar configured to engage with and thereby selectively retain the accessory,
   wherein the battery pack has both a positive pole and a negative pole at each of the first end and the opposing second end such that the battery pack operates as part of the energy storage and power supply system regardless of the orientation thereof.

8. The energy storage and power supply device of claim 7, wherein the battery pack includes:
   a cell having an elongated shape, the cell defining a positive terminal at the first end of the battery pack and a negative terminal at the opposing second end of the battery pack;
   a first strap coupling the positive terminal of the cell to the positive pole of the opposing second end of the battery pack; and
   a second strap coupling the negative terminal of the cell to the negative pole of the first end of the battery pack.

9. The energy storage and power supply device of claim 8, wherein the battery pack includes:
   a protection circuit module having an input coupled to the positive terminal of the cell with the first strap and an output coupled to the positive pole of the opposing second end of the battery pack; and
   a third strap coupling the output of the protection circuit module to the positive pole of the first end of the battery pack.

10. The energy storage and power supply device of claim 9, wherein the battery pack includes a positive thermal coefficient resistor having a second input coupled to the negative terminal of the cell and a second output coupled to the negative poles of the battery pack.

11. The energy storage and power supply device of claim 10, wherein the battery pack includes:
   a first printed circuit board having an outer side that defines the positive pole and the negative pole of the first end of the battery pack and an opposing inner side that is coupled to the second strap and the third strap with a negative contact and a protected positive contact, respectively; and
   a second printed circuit board having an outer side that defines the positive pole and the negative pole of the opposing second end of the battery pack and an opposing inner side that is coupled to the first strap, the second strap, and the third strap with an unprotected positive contact, a second negative contact, and a second protected positive contact, respectively.

12. The energy storage and power supply device of claim 7, wherein the negative poles of the first end and the opposing second end of the battery pack are annular and surround the positive poles of the first end and the opposing second end.

13. The energy storage and power supply device of claim 7, wherein the battery pack is configured to receive electrical power from a solar panel.

14. An energy storage and power supply system, comprising:
   a body;
   a battery pack disposed within the body and having a first set of positive and negative poles and a second set of positive and negative poles, wherein the negative poles of the battery pack at least one of (a) surround the positive poles of the battery pack and (b) are surrounded by the positive poles of the battery pack;
   a first connector electrically coupled to the first set of positive and negative poles with a first set of contacts;
   a second connector electrically coupled to the second set of positive and negative poles with a second set of contacts; and
   a collar configured to engage with and thereby selectively retain an accessory,
   wherein the first set of positive and negative poles and the first set of contacts are at least one of shaped, configured, and positioned to maintain electrical continuity between the battery pack and the first connector regardless of the relative orientations thereof.

15. The energy storage and power supply system of claim 14, wherein the second set of positive and negative poles and the second set of contacts are at least one of shaped, configured, and positioned to maintain electrical continuity between the battery pack and the second connector regardless of the relative orientations thereof.

16. The energy storage and power supply system of claim 14, further comprising a cap releasably coupling the first connector to the body, wherein the first connector includes at least one of a male USB connector and a pair of AC prongs.

17. The energy storage and power supply system of claim 16, wherein the first set of contacts comprise spring-loaded pogos configured to interface with the first set of positive and negative poles of the battery pack.

18. The energy storage and power supply system of claim 17, wherein the cap rotatably couples the first connector to the body, and wherein at least one of the positive pole and the negative pole of the first set of positive and negative poles is annular.

19. The energy storage and power supply system of claim 18, wherein the cap is coupled to the body with a threaded connection.

20. The energy storage and power supply system of claim 14, wherein the second connector comprises a female connector configured to provide a power output to the accessory from the battery pack, wherein the first connector comprises a male connector configured to receive electrical power to charge the battery pack.

* * * * *